(12) United States Patent
Nishihara et al.

(10) Patent No.: US 7,212,335 B2
(45) Date of Patent: May 1, 2007

(54) APPARATUS AND METHOD FOR AMPLIFICATION MEDIUM PERFORMANCE SIMULATION, AND OPTICAL AMPLIFIER

(75) Inventors: Masato Nishihara, Kawasaki (JP); Yasushi Sugaya, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/187,938

(22) Filed: Jul. 25, 2005

(65) Prior Publication Data

US 2005/0254119 A1 Nov. 17, 2005

Related U.S. Application Data

(63) Continuation of application No. PCT/JP03/008219, filed on Jun. 27, 2003.

(51) Int. Cl.
H01S 3/00 (2006.01)
H04B 10/08 (2006.01)

(52) U.S. Cl. ............... 359/341.42; 359/337.1; 398/37

(58) Field of Classification Search .......... 359/341.42, 359/337.1; 398/37
See application file for complete search history.

(56) References Cited

U.S. PATENT DOCUMENTS

| | | | | |
|---|---|---|---|---|
| 6,144,486 | A * | 11/2000 | Bennett et al. | 359/337.13 |
| 6,631,027 | B2 * | 10/2003 | Gerrish et al. | 359/341.41 |
| 6,690,508 | B2 * | 2/2004 | Tian et al. | 359/341.4 |
| 6,798,567 | B2 * | 9/2004 | Feldman et al. | 359/341.42 |
| 6,836,355 | B2 * | 12/2004 | Lelic et al. | 359/341.4 |
| 6,891,662 | B2 * | 5/2005 | Sugaya et al. | 359/337.4 |
| 2002/0041433 | A1 | 4/2002 | Terahara | 359/337.1 |
| 2002/0191276 | A1 * | 12/2002 | Onaka et al. | 359/341.2 |
| 2004/0156094 | A1 * | 8/2004 | Kawahara et al. | 359/333 |
| 2005/0254119 | A1 * | 11/2005 | Nishihara et al. | 359/334 |
| 2006/0087723 | A1 * | 4/2006 | Takeyama et al. | 359/337 |

FOREIGN PATENT DOCUMENTS

| | | |
|---|---|---|
| EP | 1033834 | 9/2000 |
| EP | 1089477 | 4/2001 |
| JP | 11-68216 | 3/1999 |
| JP | 11-224967 | 8/1999 |
| JP | 2000-252923 | 9/2000 |

(Continued)

OTHER PUBLICATIONS

Jou et al. Application of SPICE Simulation to Study WDM and SCM Systems Using EDFAs with Chirping. IEEE Transactions On Education, vol. 45, No. 3, Aug. 2002.*

(Continued)

*Primary Examiner*—Deandra M. Hughes
(74) *Attorney, Agent, or Firm*—Staas & Halsey LLP

(57) ABSTRACT

An amplification medium simulation apparatus comprises a basic data retaining unit 21, an input signal beam information retaining unit 22, and a simulation executing unit 31 approximating and calculating an output signal beam power at each signal beam wavelength outputted from the amplification medium involving a fluctuation in ion population at the metastable energy level in the amplification medium due to input of the input signal beam, by using contents retained in the basic data retaining unit 21 and the input signal beam information retaining unit 22, and outputting a result of calculation as a result of simulation of performance of the amplification medium.

25 Claims, 18 Drawing Sheets

FOREIGN PATENT DOCUMENTS

| | | |
|---|---|---|
| JP | 2000-261078 | 9/2000 |
| JP | 2000-261079 | 9/2000 |
| JP | 2001-103013 | 4/2001 |
| WO | WO 98/36294 | 8/1998 |

OTHER PUBLICATIONS

R. C. Giles, et al., "Modeling Erbium-Doped Fiber Amplifiers", Journal of Lightwave Technology, vol. 9, No. 2, Feb. 1991.

M. Nishihara, et al., "Characterization and New Numerical Model of Spectral Hole Burning In Broadband Erbium-Doped Fiber Amplifier", 2003 Optical Society of America.

T. Aizawa, et al., "Effect of Spectral-Hole Burning on Multi-Channel EDFA Gain Profile", In: Proceedings of Conference on Optical Communication 1999, (OFC'99), WGI, 1999, p. 102-104.

E. Desurvire, et al., "Erbium-Doped Fiber Amplifiers: Device and System Developments", John Wiley & Sons, 2002, p. 265-277.

P. C. Becker, et al., "Erbium-Doped Fiber Amplifiers: Fundamentals and Technology", Academic Press, 1999, p. 156-161, 429-449.

Japanese Patent Office Action Notice of Grounds of Rejection mailed Dec. 12, 2006, in corresponding Japanese application 2005-503228.

\* cited by examiner

APPARATUS AND METHOD FOR AMPLIFICATION MEDIUM PERFORMANCE SIMULATION, AND OPTICAL AMPLIFIER

This application is a continuation application, filed under 35 USC 111(a), of International Application PCT/JP2003/008219, filed Jun. 27, 2003.

TECHNICAL FIELD

The present invention relates to an apparatus and a method for amplification medium performance simulation, and an optical amplifier.

On the basis of a rapid increase in data communication traffic with a recent rapid spread of the Internet, focused is a technique relating to a wavelength division multiplexing transmission technique which is a technique for increasing the speed and capacity of the network, and a photonic network which is a network in which each wavelength transmitted by means of the wavelength division multiplexing transmission technique is supposed to be one communication path.

The present invention relates to an apparatus and a method for amplification medium performance simulation suitable for use in simulation of performance of an amplification medium applied when a photonic network is configured, and an optical amplifier made on the basis of a result of simulation obtained by this apparatus.

BACKGROUND ART

Because of expectation for realization of an optical network (photonic network) having high flexibility, it is required for a node configuring the network to cope with a large change in the number of wavelengths, which are supposed to be a communication path. Particularly, an optical amplifier which is a constitutional element of a node is required to cope with a large change in allocation and the number of wavelengths to stabilize the amplification characteristic.

The wavelength characteristic of an amplification medium such as an EDFA (Erbium Doped Fiber Amplifier) used in a known optical network system, in which allocation and the number of the wavelengths are assumed not to be largely changed, can be presupposed to depend upon only population inversion by a single band approximation (refer to non-patent document 1). Namely, the wavelength characteristic can be approximated and grasped according to the value of the population inversion rate, with the whole amplification band of the EDFA being one unit.

In concrete, as shown in FIG. 24, a pattern of relative gain coefficients as being the wavelength characteristic over the whole range of the amplification bandwidth (wavelengths from 1500 to 1580 nm of an input signal light in the drawing) of the EDFA can be grasped for each population inversion rate. Accordingly, wavelength flatness of the EDF in C band (Conventional Band) is realized by combining the automatic gain control by which the population inversion is controlled to be constant, and the gain equalizer according to the relative gain coefficient distribution corresponding to the population inversion that is controlled to be constant.

FIG. 25 shows an example of the structure of an optical repeater 100 used in a known optical network system in which wavelength allocation and the number of wavelengths are not largely changed. The optical repeater 100 shown in FIG. 25 is configured by inserting an optical attenuator (VOA: Variable Optical Attenuator) 102 between two EDFA amplifying units 101-1 and 101-2 serially connected.

Each of the EDFA amplifying units 101-1 and 101-2 comprises branching couplers 101a and 101b, an EDFA 101c, photodiodes (PD: Photo Diode) 101d and 101e, and a control circuit 101f. In each of the EDFA amplifying units 101-1 and 101-2, the input/output powers are monitored by the respective photodiodes 101d and 101e, and an optical signal amplified by the EDFA 101c under the automatic gain control by the control circuit 101f is outputted.

As shown in FIG. 26, for example, when the input power of the optical repeater 100 is changed from the first level to the second level, the output power of the optical repeater 100 is made constant by adjusting the quantity of loss in the variable optical attenuator 102 while keeping the gain in each of the EDFA amplifying units 101-1 and 101-2 constant.

If the amplification characteristic of the EDFA 101c in each of the EDFA amplifying units 101-1 and 101-2 is assumed to be an optical network that can be approximated to a single band, the gain wavelength characteristic can be always kept constant by keeping the gain of each of the EDFA 101c constant. Accordingly, it becomes possible to make the gain wavelength characteristic of the optical repeater 100 flat irrespective of the input power, by disposing a gain equalizer whose loss characteristic is appropriately designed in the following stage of the EDFA amplifying units 101-1 and 101-2.

Namely, since it is supposed that the known optical repeater is applied to an optical network in which wavelength allocation and the number of wavelengths are not largely changed, the gain equalizer arranged in the following stage of the EDFA amplifying units 101-1 and 101-2 is designed on the assumption that the wavelength characteristic of an amplifying medium as above is approximated to a single band.

However, in an optical network recently demanded in which wavelength allocation and the number of wavelengths are largely changed, the gain deviation due to an effect of spectral hole burning (SHB: Spectral-Hole Burning) which is a local gain saturation effect in the wavelength region cannot be ignored when the selected wavelengths are arranged to be particularly gathered in a narrow band. Since the effect of this SHB differs according to wavelength allocation supposed in the optical network, it is necessary to analyze the gain deviation caused by SHB according to the wavelength allocation beforehand supposed when the apparatus is designed.

FIG. 27 shows gain deviation characteristic due to SHB of an EDFA. When a gain wavelength characteristic A in the saturated state where a saturation signal at 1540 nm (signal saturating the gain of the EDFA) is compared with a gain wavelength characteristic B in the non-saturated state where no saturation signal is inputted, it can be confirmed that, in the saturated state, the gain in the vicinity of the saturation signal wavelength and 1530 nm is decreased (refer to a gain difference C between the characteristics A and B) to make holes.

This phenomenon occurs due to a local gain saturation phenomenon of a gain medium having inhomogeneous broadening. In the known single band approximation, this local change in gain wavelength characteristic is ignored.

As a model of EDFA in which SHB is considered, there have been reported a model (refer to non-patent document 2) which separately deals with the absorption/emission process and the saturation process between energy levels formed by the inhomogeneous broadening, and a model which adds the quantity of gain fluctuation due to SHB derived from a result obtained by separately measuring the gain wavelength characteristic obtained by means of single band approximation (refer to non-patent document 3).

As techniques relating to the present invention, there are also techniques described in Patent Document 1 and Patent Document 2 shown below.

However, the technique described in Non-Patent Document 2 provides a very complex calculation formula for analyzing the gain deviation, thus has a disadvantage that the process requires a long time. The technique described in Non-Patent Document 3 considers only the neighborhood of the signal wavelength, thus has a disadvantage that the gain fluctuation in the vicinity of 1530 nm cannot be modeled.

As a method of measuring the amplification characteristic of an amplification medium, there is a method (hardware simulation) for measuring the amplification characteristic from an actually formed optical amplifier other than the method of calculating through numerical value calculation described above. However, some sorts of hardware simulation take a long time or require much labor to measure entirely the wide operation conditions of an optical repeater.

In the light of the above problems, an object of the present invention is to provide an apparatus and a method for amplification medium performance simulation, and an optical amplifier, which introduce a simple approximate expression, thereby modeling gain fluctuation in a range other than the neighborhood of the signal wave within a short time.

Non-Patent Document 1: C. R. Giles, et al., "Modeling Erbium Doped Fiber Amplifiers," IEEE J. of Lightwave Tchnol., pp. 271–283, vol. 9, no. 2, Feb., 1991;

Non-Patent Document 2: E. Desurvire, "ERBIUM-DOPED FIBER AMPLIFIERS Principles and Applications," John Wiley & Sons, Inc., Chapter 4, 1994;

Non-Patent Document 3: T. Aizawa, et al., "Effect of Spectral-Hole Burning on Multi Channel EDFA Gain Profile," OFC'99, WG1, 1999;

Patent Document 1: Japanese Patent Application Laid-Open No. 2000-261078; and

Patent Document 2: Japanese Patent Application Laid-Open No. 2000-261079.

DISCLOSURE OF INVENTION

To attain the above object, the present invention provides an amplification medium performance simulation apparatus for simulating performance of an amplification medium excited by a pump beam from a pumping source to amplify a signal beam comprising a basic data retaining unit for retaining basic data of the amplification medium, an input signal beam information retaining unit for retaining a total power and a power at each wavelength of an input signal beam as information on the input signal beam to be inputted to an amplification medium to be simulated, and a simulation executing unit for reckoning a fluctuation in ion population at a metastable energy level in the amplification medium caused by input of the input signal beam, and approximating and calculating an output signal beam power at each signal beam wavelength outputted from the amplification medium, by using contents retained in the basic data retaining unit and the input signal beam retaining unit, and outputting a result of the calculation as a result of simulation of the performance of the amplification medium.

The simulation executing unit may comprise a population inversion rate calculating unit for calculating a population inversion rate on the basis of a signal beam power according to a position with a coordinate in the longitudinal direction of the amplification medium, a population inversion rate change quantity calculating unit for calculating a quantity of a change in population inversion rate which may occur due to a fluctuation in ion population at the metastable energy level of the amplification medium caused by input of the input signal beam, as a function of a wavelength of the input signal beam and a position in the longitudinal direction of the amplification medium, by using the population inversion rate calculated by the population inversion rate calculating unit and contents retained in the basic data retaining unit and the input signal beam information retaining unit, a signal beam power change calculating unit for performing calculation of a change in optical power of the signal beam propagating through the amplification medium from a signal beam input end in the amplification medium in each of minute propagation ranges started from the signal beam input end and terminated at a signal beam output end, by using a differential equation defined by the quantity of a change in population inversion rate calculated by the population inversion rate change quantity calculating unit and the contents retained in the basic data retaining unit and the input signal beam information retaining unit, a signal beam power calculating unit for adding, in order, changes in optical power in the minute propagation ranges from a change in optical power in the minute propagation range at the signal input end as a starting point to a change in optical power in the minute range at the signal output end as a terminating point calculated by the signal beam power change calculating unit to the power value of the input signal beam retained in the input signal beam information retaining unit, to calculate a signal beam power according to a position with a coordinate in the longitudinal direction of the signal beam propagating in the amplification medium including the fluctuation in ion population at the metastable energy level in the amplification medium caused by input of the input signal beam, and an outputting process unit for outputting a result of calculation of the power of the signal beam outputted from the signal beam output end calculated by the signal beam power calculating unit as a result of simulation of the performance of the amplification medium.

Preferably, the population inversion rate change quantity calculating unit uses at least one or more Gaussian functions as functions for calculating the quantity of a change in the population inversion rate.

The population inversion rate change quantity calculating unit for calculating a quantity of a change in the population inversion rate may comprise a first function operating unit for operating a first function having a first wavelength band in a gain saturation state as a center, a second function operating unit for operating a second function comprised of a function having a second wavelength band characteristic of the amplification medium as a center, and an adding unit for adding results of the operations from the first function operating unit and the second function operating unit.

Preferably, the first function operated by the first function operating unit is composed of a total of Gaussian functions given according to respective wavelengths of the input signal beam, and the second function operated by the second function operating unit is composed of a total of a plurality of Gaussian functions.

In this case, the Gaussian function given according to each wavelength of the input signal beam in the first function is determined as a value expressed in terms of a center wavelength which is a wavelength of the input signal beam and a full width half maximum according to the amplification medium, each of the Gaussian functions in the second function is determined as a value expressed in terms of a center wavelength which is in a second wavelength band characteristic of the amplification medium and a full width half maximum according to the amplification medium, and the full width half maximum of each of the Gaussian functions in the first function and the second function is retained in the basic data retaining unit.

A depth of each of the Gaussian functions in the first function or the second function may be defined by a depth function which increases as a total power of the input signal beam increases, and saturates above a predetermined value.

In this case, the depth function of each Gaussian function given according to each wavelength of the input signal beam in the first function may be defined by a function having a wavelength $\lambda_i$ of the input signal beam, an optical power $P_i(z)$ at a position with a coordinate z in the longitudinal direction of the amplification medium at the wavelength $\lambda_i$ of the input signal beam and a total power $P_{total}(z)$ of the input signal beam at a position with a coordinate z in the longitudinal direction of the amplification medium as variables, the depth function of each Gaussian function in the second function may be defined by a function having a wavelength $\lambda_i$ in the second wavelength band, a total power $P_{total}(z)$ of the input signal beam at a position with the coordinate z in the longitudinal direction of the amplification medium and a population inversion rate n(z) of the amplification medium as variables, and coefficients defining the depth functions of the Gaussian functions in the first function and the second function may be retained in the basic data retaining unit.

The basic data retaining unit may retain, as the basic data of the amplification medium, at least an overall length of the amplification medium, a gain coefficient $g(\lambda)$, an absorption coefficient $\alpha(\lambda)$ and a loss $l(\lambda)$ expressed as functional equations with respect to each input signal beam wavelength, and a population inversion rate n(z) not added thereto the fluctuation in ion population at the metastable energy level in the amplification medium, the signal beam power change calculating unit may calculate the population inversion rate n(z) from a signal beam power according to a position with a coordinate in the longitudinal direction of the signal beam propagating in the amplification medium calculated by the signal beam power calculating unit, and calculate a minute change in optical power of the signal beam propagating at a position with the coordinate z in the longitudinal direction of the amplification medium, by using a change in optical power in each minute unit of the length in the longitudinal direction of the amplification medium $$dP(z)/dz=\{(g(\lambda)+\alpha(\lambda))(n(z)+\Delta n_{SHB}(\lambda, z))-(\alpha(\lambda)+1(\lambda))\}\cdot P(z)$$

using the population inversion rate n(z), the change quantity $\Delta n_{SHB}(\lambda,z)$ of the population inversion rate calculated by the population inversion rate change quantity calculating unit and the basic data retained in the basic data retaining unit.

Preferably, the simulation executing unit approximates and calculates gain deviation among signal beam wavelengths caused by spectral hole burning.

The present invention further provides an amplification medium performance simulation method for simulating performance of an amplification medium excited by a pump beam from a pumping source to amplify a signal beam, comprising a population inversion rate change quantity calculating step of calculating a quantity of a change in population inversion rate which may occur due to a fluctuation in ion population at a metastable energy level of the amplification medium caused by input of the signal beam, an optical power change calculating step of performing calculation of a change in optical power of the signal beam propagating in the amplification medium from a signal beam input end of the amplification medium in each of minute propagation ranges started from the signal beam input end and terminated at a signal beam output end, by using a propagation equation of the amplification medium on the basis of a corrected population inversion rate corrected with the quantity of a change in population inversion rate calculated at the population inversion rate change quantity calculating unit, an output signal beam power calculating step of performing successive addition of each change in optical power in the minute propagation range calculated at the optical power change calculating step to the power value of the input signal beam between the signal beam input end and the signal beam output end, to calculate an output signal beam power outputted from the amplification medium including the fluctuation in ion population at the metastable energy level in the amplification medium due to input of the input signal beam, and an outputting process step of outputting a result of calculation calculated at the output signal beam power calculating step as a result of simulation of the performance of the amplification medium.

The present invention still further provides an optical amplifier comprising a pumping source for outputting a pump beam, a signal beam amplification medium excited by the pump beam from the pumping source to amplify an input signal beam, and a gain equalizer for equalizing a gain of an output signal beam outputted from the signal beam amplification medium, wherein the gain equalizer has a gain equalization characteristic so that it compensates gain deviation due to a fluctuation in ion population at a metastable energy level in the amplification medium caused by input of the input signal beam, on the basis of a result of simulation outputted from an amplification medium performance simulation apparatus for simulating the performance of the amplification medium excited by the pump beam from the pumping source to amplify the signal beam, the amplification medium performance simulation apparatus comprising a basic data retaining unit for retaining basic data of the amplification medium, an input signal beam information retaining unit for retaining a total power and a power at each wavelength of the input signal beam as information on the input signal beam to be inputted to the amplification medium to be simulated, and a simulation executing unit for reckoning a fluctuation in ion population at a metastable energy level in the amplification medium caused by input of the input signal beam, and approximating and calculating an output signal beam power at each signal beam wavelength outputted from the amplification medium, by using contents retained in the basic data retaining unit and the input signal beam information retaining unit, and outputting a result of calculation as a result of simulation of the performance of the amplification medium.

The present invention still further provides an optical amplifier comprising a pumping source for outputting a pump beam, a signal beam amplification medium excited by the pump beam from the pumping source to amplify an input signal beam, and a pumping source controlling unit for controlling the pumping source, the pumping source controlling unit controlling the pumping source so that it compensates gain deviation due to a fluctuation in ion population at a metastable energy level in the amplification medium caused by input of the input signal beam, on the basis of a result of simulation outputted from an amplification medium performance simulation apparatus for simulating the performance of the amplification medium excited by the pump beam from the pumping source to amplify the signal beam, the amplification medium performance simulation apparatus comprising a basic data retaining unit for retaining basic data of the amplification medium, an input signal beam information retaining unit for retaining a total power and a power at each wavelength of the input signal beam as information on the input signal beam to be inputted to the amplification medium to be simulated, and a simulation executing unit for reckoning a fluctuation in ion population at a metastable energy level in the amplification medium caused by input of the input signal beam, and approximating and calculating an output signal beam power at each signal beam wavelength outputted from the amplification medium, by using contents retained in the basic data retaining unit and the input signal beam information retaining unit, and outputting a result of calculation as a result of simulation of the performance of the amplification medium.

In this case, the pumping source controlling unit may comprise a first power monitor for monitoring powers of the input signal beam and the output signal beam, a wavelength allocation information obtaining unit for obtaining wavelength allocation information on a signal beam propagating in the amplification medium, an automatic gain control unit for outputting a signal for controlling the pumping source obtained on the basis of the powers of the input signal beam and the output signal beam monitored by the first power monitor so that a gain of the optical signal amplification medium is constant, and a correcting unit for correcting a control quantity for the pumping source in the automatic gain control unit on the basis of the wavelength allocation information obtained by the wavelength allocation information obtaining unit so that gain deviation in a wavelength band due to spectral hole burning decreases.

The wavelength allocation information obtaining unit may be comprised of a spectrum analyzer monitoring wavelength allocation of a signal beam inputted to or outputted from the amplification medium. The wavelength allocation information obtaining unit may obtain the wavelength allocation information from a control signal beam transmitted together with the signal beam.

The pumping source controlling unit may comprise a second power monitor for obtaining powers of the input signal beam and the output signal beam in each of a plurality of bands divided on the basis of a result of the simulation obtained by the amplification medium performance simulation apparatus, and an automatic average gain control unit for outputting a signal for controlling the pumping source on the basis of the powers of the input signal beam and the output signal beam in each of the bands obtained by the second power monitor so that average gains in the bands are equalized.

As above, according to the apparatus and method for amplification medium performance simulation of this invention, the simulation executing unit introduces a simple approximate expression to be able to output gain deviation occurring due to a local fluctuation in ion population in a wavelength region at a metastable energy level in each minute unit of the length in the longitudinal direction of the amplification medium, involving gain deviation in a region other than the neighborhood of the signal wave, through a process within a short period of time, as a result of simulation.

In the optical amplifier according to this invention, it is possible to control the pumping source by the pumping source controlling unit or designed the gain equalizer on the basis of a result of highly accurate simulation obtained through a process within a short period of time from the simulation executing unit of the amplification medium performance simulation apparatus of this invention, whereby gain deviation due to a local fluctuation in ion population in a wavelength region at a metastable energy level in the amplification medium is compensated. It is thus possible to largely improve the stability of the automatic gain control.

Particularly, in an optical amplifier which is a constitutional element of a node in a photonic network in which the wavelength allocation of a signal beam can be dynamically changed, it is possible to improve the stability of the amplification characteristic according to a large change in wavelength allocation and the number of wavelengths.

BEST MODE FOR CARRYING OUT THE INVENTION

Hereinafter, description will be made of embodiments of the present invention with reference to the drawings.

(a) Description of First Embodiment

Figure 1:
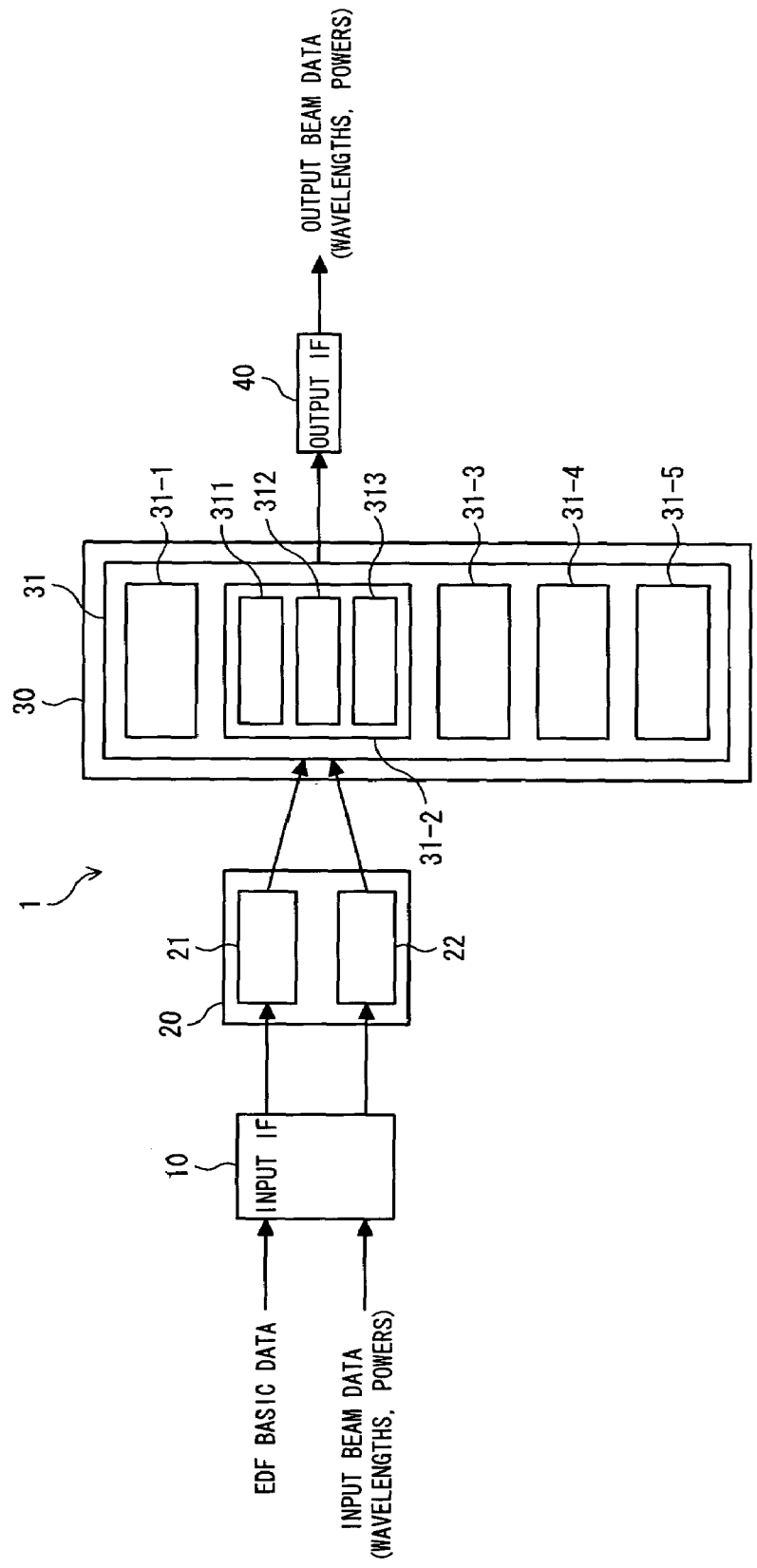
FIG. 1 is a block diagram showing an amplification medium performance simulation apparatus according to a first embodiment of this invention.

FIG. 1 is a block diagram showing an amplification medium performance simulation apparatus 1 according to a first embodiment of this invention. The amplification medium performance simulation apparatus 1 shown in FIG. 1 simulates the performance of an amplification medium. Particularly, the amplification medium performance simulation apparatus 1 can carry out simulation of the output power characteristic and gain characteristic of an amplification medium in an optical amplifier applied to an apparatus configuring a photonic network.

When an optical amplifier assumed to be applied to an optical network in which wavelength allocation and the number of wavelengths are largely changed is designed, the gain wavelength characteristic of an amplification medium to be evaluated is accurately grasped, whereby the input/output power characteristic and the characteristics of a gain equalizer are so designed as to secure the gain flatness.

In the amplification medium performance simulation apparatus 1, an EDFA, for example, can be used as the amplification medium to be simulated. Hereinafter, a case where an EDFA is used as the amplification medium, but another amplification medium other than the EDFA can be used.

The amplification medium performance simulation apparatus 1 according to the first embodiment can simulate the gain deviation characteristic of an EDFA occurring due to SHB as above by obtaining basic data of the EDFA and information on the input signal beam. Now, description will be made of a principle of calculation of the gain deviation characteristic of the EDFA due to SHB in the amplification medium performance simulation apparatus 1.

Figure 27:
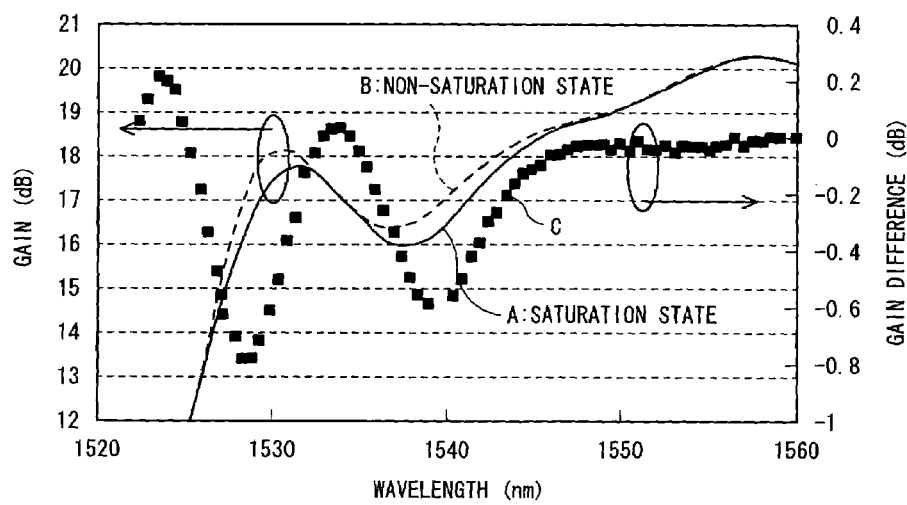
FIG. 27 is a diagram showing a gain deviation characteristic due to SHB of an EDFA.

As described above with reference to FIG. 27, it is found that the effect of inhomogeneous broadening at the wavelength level in the gain saturated state in an EDFA is significant particularly at the signal beam wavelength and in a 1530 nm band. Giving attention to the effect of the bands in which the inhomogeneous broadening is particularly large, the amplification medium performance simulation apparatus 1 according to this embodiment calculates the quantity of a change in the population inversion rate. Hereinafter, the gain fluctuation occurring at the signal beam wavelength will be referred to as "main hole," whereas the gain fluctuation occurring in the vicinity of 1530 nm will be referred to as "second hole."

Figure 2:
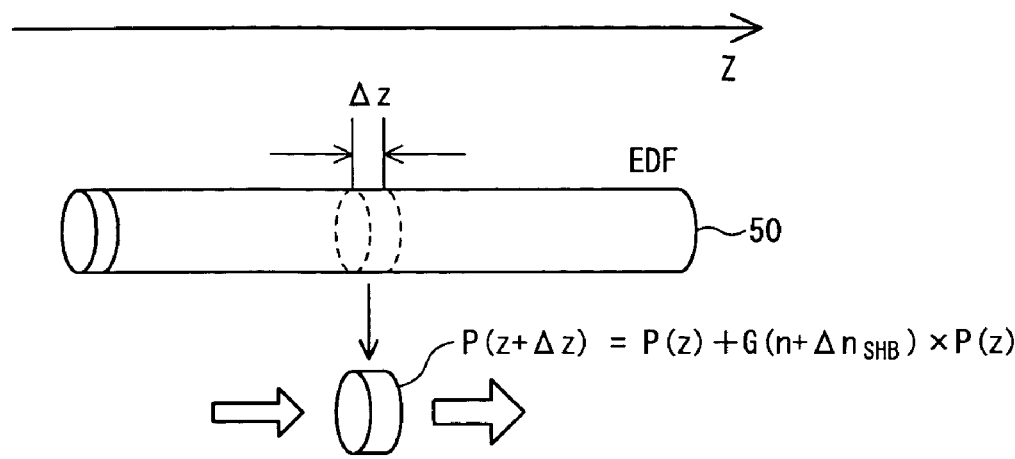
FIGS. 2 and 3 are diagrams for illustrating an operating process in the apparatus according to this invention.
Figure 3:
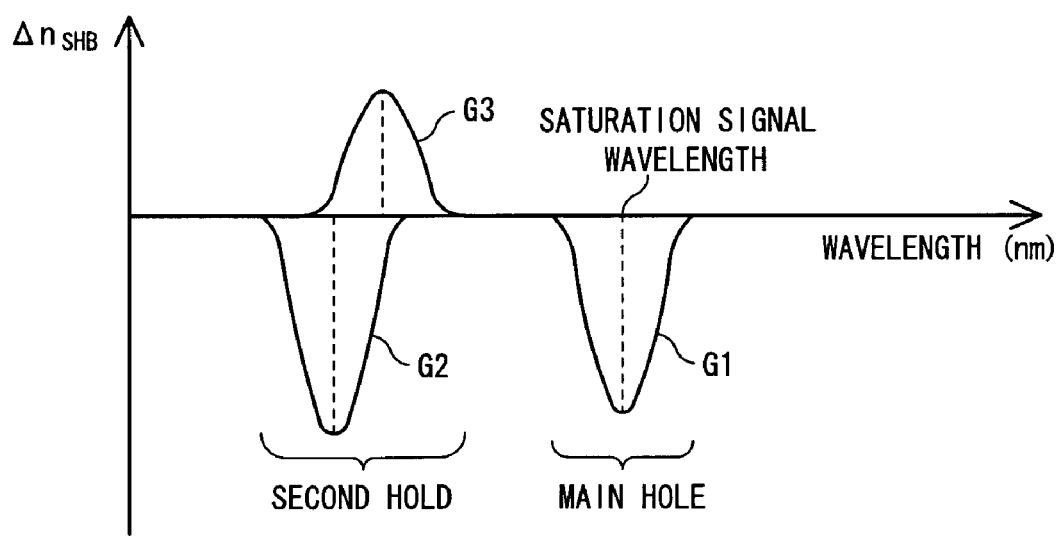

FIGS. 2 and 3 are diagrams for illustrating an operating process in the apparatus 1 according to this embodiment. The gain fluctuation due to SHB at a certain wavelength is caused by that the number of ions of $ER^{3+}$ at the metastable energy level of transition corresponding to the length of the optical wavelength changes, that is, the population inversion rate changes from its average value.

Assuming that the quantity of a change in the population inversion rate causing gain fluctuation due to SHB is $\Delta n_{SHB}$ when the signal beam propagates from a position with a coordinate z by a minute portion $\Delta z$ (refer to FIG. 2) in the longitudinal direction of an EDF 50, the optical power P $(z+\Delta z)$ at the minute portion $\Delta z$ is expressed by an equation (1). In the equation (1), n represents the population inversion rate at a position with the coordinate z in the longitudinal direction of the EDF 50, P(z) represents the signal beam power at a position with the coordinate z in the longitudinal direction of the EDF 50, and G(n) represents the gain of the EDF 50 in the case of the population inversion rate n.

$$P(z+\Delta z)=P(z)+G(n(z)+\Delta n_{SHB}(\lambda,z))\times P(z) \quad (1)$$

The propagation equation of the EDF 50 can be expressed as shown in an equation (2). In the equation (2), the population inversion rate n is represented as a function value n(z) according to the coordinate z in the longitudinal direction of the EDF 50, the value of $\Delta n_{SHB}(\lambda,z)$ is represented as a function of the signal beam wavelength $\lambda$ along with the coordinate z in the longitudinal direction of the EDF 50.

$$dP(z)/dz=\{(g(\lambda)+\alpha(\lambda))(n(z)+\Delta n_{SHB}(\lambda,z))-(\alpha(\lambda)+1(\lambda))\}\cdot P(z) \quad (2)$$

In the equation (2), $g(\lambda)$ represents the gain coefficient in the EDF 50, $\alpha(\lambda)$ represents the absorption coefficient, and $l(\lambda)$ represents the loss, which are beforehand given as functions according to the wavelength $\lambda$ of the signal beam. From the equation (2), the quantity of a minute change dP(z)/dz in the optical power at a position with the coordinate z in the longitudinal direction of the EDF 50 can be determined by obtaining the optical power P(z) at a position with the coordinate z and $n(z)+\Delta n_{SHB}(\lambda,z)$. Incidentally, n(z) can be obtained through a known calculation equation on the basis of the optical power P(z) at a position with the coordinate z in the longitudinal direction of the EDFA [refer to an equation (14) in the above Non-Patent Document 1].

Giving attention to a change in the population inversion rate in the signal beam wavelength band causing the main hole and a change in the population inversion rate in the vicinity of 1530 nm causing the second hole, $\Delta n_{SHB}(\lambda,z)$ in the formula (2) can be expressed as an equation (3):

$$\Delta n_{SHB}(\lambda, z) = \sum_i C(\lambda_i, P_i(z), P_{total}(z))\exp\left(-\ln(2)\frac{(\lambda-\lambda_i)^2}{(BW_i/2)^2}\right) + \sum_j D_j(\lambda_j, P_{total}(z), n(z))\exp\left(-\ln(2)\left(\frac{(\lambda-\lambda_j)^2}{(BW_j/2)^2}\right)\right) \quad (3)$$

The above equation (3) has a structure in which Gaussian functions representing changes in the population inversion rates corresponding to the main hole and the second hole are added.

A term (the first function to be described later) of the population inversion rate change corresponding to the main hole is modeled with a total of changes in the population inversion rate each represented by one Gaussian function for each signal beam wavelength (channel) to be transmitted as a signal beam. A term (the second function to be described later) of the population inversion rate change corresponding to the second hole is modeled with a total of a plurality (j) of Gaussian functions not depending on the signal beam wavelength.

When the signal beam wavelength is one wavelength, for example, a change in the population inversion rate corresponding to the main hole can be expressed as a single Gaussian function G1 having the signal beam wavelength (or the saturation signal wavelength) as the center wavelength, whereas a change in the population inversion rate corresponding to the second hole can be expressed by a sum of two Gaussian functions G2 and G3 having a wavelength in the 1530 nm band as the center wavelength, as shown in FIG. 3.

In the equation (3), the first term represents the main hole, the second term represents the second hole, wherein $\lambda_i$ represents the signal beam wavelength of a channel i, $\lambda_j$ represents the center wavelength of the Gaussian function of the second hole, $P_i(z)$ represents the signal power in a channel i propagating at a position with the coordinate z, $P_{total}(z)$ is the total power of a signal beam propagating at a position with the coordinate z, and $BW_i$ and $BW_j$ are full width half maximums of the respective Gaussian functions.

$C(\lambda_i, P_i(z), P_{total}(z))$ is a depth function determining the depth of the main hole formed by the signal beam in a channel i. $D_j(\lambda_j, P_{total}(Z), n(z))$ is a depth function determining the second hole, for both of which a function whose depth increases as the total power of the signal beam propagating at a position with the coordinate z increases, and saturates when the power is above a predetermined value can be used.

The function $C(\lambda_i, P_i(z), P_{total}(z))$ and the function $D_j(\lambda_j, P_{total}(z), n(z))$ can be expressed by equations (4) and (5), respectively.

$$C(\lambda_i, P_i(z), P_{total}(z)) = \left(\frac{P(z, \lambda_i)}{P_{total}(z)}\right)(c_1 \lambda_i^2 + c_2 \lambda + c_3)\{1 - \exp(-c_4 P_{total}(z))\} \quad (4)$$

$$D_j(\lambda_j, P_{total}(z), n(z)) = d_{1,j}(\exp(d_{2,j} n(z)))\{1 - \exp(-d_{3,j} P_{total}(z))\} \quad (5)$$

From a relationship between the above equations (2) and (3), a value of $\Delta n_{SHB}(\lambda, 0)$ in the equation (3) is calculated along with n(z) on the basis of the power ($P_i(0)$) at the time that the signal beam is inputted to the EDF 50, and the calculated $\Delta n_{SHB}(\lambda, 0)$ is used for the equation (2), whereby a minute change in the optical power propagating at the position of the minute portion $\Delta z$ at a signal beam input end of the EDF 50.

Further, the minute change in the optical power calculated as above is added to the input signal beam power $P_i(0)$ to obtain a signal beam power $P_i(\Delta z)$ propagating at a position $\Delta z$. Whereby, a change in the optical power in the case where the signal beam further propagates by the minute portion $\Delta z$ from the coordinate $z=\Delta z$ in the longitudinal direction of the EDF 50 can be calculated in a manner similar to the above.

By repeating the above calculation, it is possible to calculate a change in the optical power in the case where the signal beam further propagates by the minute portion $\Delta z$ from the coordinate z in the longitudinal direction between the signal beam input end (z=0) and the output end (z=L) of the EDF 50. An optical power at the time that the signal beam is outputted from the output end position of the EDF 50 can be finally calculated.

Namely, since an optical power after amplified by the EDF 50 at each signal beam wavelength can be obtained through the arithmetic process of the equations (2) and (3), the gain deviation gain characteristic of each signal wavelength of the EDF 50 can be calculated from the input signal beam power and the optical power at each signal beam wavelength calculated as above.

Next, description will be made of a structure for simulating the gain deviation characteristic of the EDFA caused by SHB according to the above principle on the basis of basic data of the EDFA and information on the input signal beam in the amplification medium performance simulation apparatus 1 according to this embodiment.

The amplification medium performance simulation apparatus 1 comprises, as shown in FIG. 1, an input interface (input IF) 10 such as a keyboard or the like, a storage unit 20 such as a hard disk or a memory, an arithmetic processing unit 30 such as a CPU (Central Processing Unit) or the like, and an output interface 40 such as a display, a printer or the like.

The amplification medium performance simulation apparatus 1 is inputted thereto the basic data of an EDFA to be evaluated and information on an input signal beam to be inputted to the EDFA through the input interface 10, retains the basic data and the input signal beam information in the storage unit 20, calculates a result of simulation of the performance of the EDFA through an arithmetic process in the arithmetic processing unit 30 using the data stored in the storage unit 20, and outputs the result through the output interface 40.

The storage unit 20 comprises a basic data retaining unit 21 for retaining the basic data of the EDFA whose characteristic is to be evaluated, and an input signal beam information retaining unit 22 for retaining wavelength values and optical power values of the input signal beam as information on the input signal beam to be inputted to the EDFA whose characteristic is to be evaluated.

As the basic data of the EDFA inputted through the above input interface 10 and held in the basic data retaining unit 21, information or the like on coefficients, constants or known functions specified by the adopted EDFA and used in the arithmetic process by the above arithmetic processing unit 30 can be included, along with the fiber length L and the fiber diameter of the EDFA whose characteristic is to be evaluated.

Namely, the gain coefficient $g(\lambda)$, the absorption coefficient $\alpha(\lambda)$, the loss $l(\lambda)$, the population inversion rate $n(z)$, the center wavelength $\lambda$ in the Gaussian functional equation corresponding to the second hole, the full width half maximums $BW_i$ and $BW_j$ of the respective Gaussian functions, the coefficients $c_1$ to $C_4$, $d_1$, $d_{2,j}$ and $d_{3,j}$ of the depth functions of respective Gaussian functions used in the arithmetic process of the above equations (2) through (5) can be retained in the above basic data retaining unit 21 as the basic data of the EDF 50.

The amplification medium performance simulation apparatus 1 can calculate a change in the gain characteristic caused by SHB in order to cope with a case where a wavelength multiplexed signal beam is inputted to the EDFA. In such case, the input signal beam information retaining unit 22 retains data of each wavelength of the wavelength-multiplexed signal beam, data of the power of the signal beam at each wavelength and the total power of the inputted wavelength-multiplexed signal beam as the input signal beam information.

The arithmetic processing unit 30 executes a program stored in the storage unit 20, and outputs a result of the execution to the output interface 40, having a function as a simulation executing unit 31. The function as being the simulation executing unit 31 can be realized by loading the program in a storage medium and executing the program by the arithmetic processing unit 30.

The simulation executing unit 31 approximates and calculates a signal beam power at each signal beam wavelength outputted from the EDFA including a fluctuation in the ion population at the metastable energy level of the EDFA to be evaluated due to input of the input signal beam, by using the contents retained in the basic data retaining unit 21 and the input signal beam information retaining unit 22, and outputs a result of the calculation as a result of simulation of the performance of the EDFA.

The simulation executing unit 31 comprises a population inversion rate change quantity calculating unit 31-1, a signal beam power change calculating unit 31-2, a signal beam power calculating unit 31-3, an uncorrected population inversion rate calculating unit 31-4 and an outputting process unit 31-5.

The population inversion rate change quantity calculating unit 31-1 calculates a quantity of a change in the population inversion rate that can occur due to a fluctuation in the ion population at the metastable energy level of the EDF 50 caused by that the input signal beam is inputted, by using a population inversion rate calculated by the uncorrected population inversion rate calculating unit 31-4 to be described later and contents retained in the basic data retaining unit 21 and the input signal beam information retaining unit 22.

In concrete, the population inversion rate change quantity calculating unit 31-1 calculates a quantity of a change in the population inversion rate as a function of a wavelength of the input signal beam and a coordinate in the longitudinal direction of the EDF 50 through an arithmetic operation using at least one or more wavelength functions having a mountain- or valley-like shape having a center wavelength and a width.

The signal power change calculating unit 31-2 calculates a change in the optical power of a signal beam propagating in the EDF 50 from the signal beam input end in the EDF 50 within each of minute propagation ranges started from the signal beam input end and terminated at the signal beam output end as a unit, by using a differential equation defined by a quantity of a change in the population inversion rate calculated by the population inversion rate change quantity calculating unit 31-1 and the contents retained in the basic data retaining unit 21 and the input signal beam information retaining unit 22.

The signal beam power change calculating unit 31-2 obtains coefficient data or constant data in the above equation (2) by using the contents retained in the basic data retaining unit 21 and the input signal beam information retaining unit 22, thereby calculating a change in the optical power of the signal beam propagating at a position with the coordinate z in the longitudinal direction of the EDF 50.

The population inversion rate change quantity calculating unit 31-1 obtains coefficient data or constant data in the above equations (3) to (5) by using the contents retained in the basic data retaining unit 21 and the input signal beam information retaining unit 22, thereby calculating a change quantity $\Delta n_{SHB}(\lambda,z)$ of the population inversion rate to be used in calculation by the above signal power change calculating unit 31-2.

Namely, the population inversion rate change quantity calculating unit 31-1 for calculating a quantity of a change in the population inversion rate comprises a first function arithmetic unit 311 for operating the first term in the equation (3) as the first function having the first wavelength band (signal beam wavelength band) in the gain saturated state as the center, a second function arithmetic unit 312 for operating the second term in the equation (3) as the second function comprised of a function having the second wavelength band (1530 nm band) characteristic of the EDFA, and an adding unit 313 for adding results of calculation by the first function arithmetic unit 311 and the second function arithmetic unit 312.

The first function operated by the first function arithmetic unit 311 is composed of a total of Gaussian functions given according to respective wavelengths $\lambda_i$ of the input signal beam, whereas the second function operated by the second function arithmetic unit 312 is composed of a total of a plurality [j in the equation (3)] of Gaussian functions.

The Gaussian function given according to a wavelength of the input signal beam in the first function is determined as a value in terms of a wavelength $\lambda_i$ of the input signal beam as the center wavelength and a full width half maximum $BW_i$ according to the EDFA. Each of the Gaussian functions configuring the second function is determined as a value in terms of the second wavelength band (1530 nm band) characteristic of the amplification medium as the center wavelength and a full width half maximum $BW_j$ according to the EDFA. The full width half maximums $BW_i$ and $BW_j$ in the first function and the second function are retained in the basic data retaining unit 21.

The depth of each of the Gaussian functions in the first function is defined by a depth function C [refer to the equation (4)] which increases as the total power of the input signal increases, and saturates above a fixed value. Similarly, the depth of each of the Gaussian functions in the second function is defined by a depth function D [refer to equation (5)] which increases as the total power of the input signal beam increases, and saturates above a fixed value.

Namely, the depth function in each Gaussian function given according to a wavelength of the input signal beam in the first function is defined by a function having a wavelength $\lambda_i$ of the input signal beam, an optical power $P_i(z)$ at a position with a coordinate z in the longitudinal direction of the EDFA at the wavelength $\lambda_i$ of the input signal beam, and a total power $P_{total}(z)$ of the signal beam propagating at a position with the coordinate z in the longitudinal direction of the EDFA as variables, as shown in the above equation (4).

The depth function in each Gaussian function in the second function is defined by a function having a wavelength $\lambda_j$ in the second wavelength band, a total power $P_{total}(z)$ of the signal beam propagating at a position with the coordinate z in the longitudinal direction of the EDFA, and a population inversion rate n(z) of the EDFA as variables, as shown in the above equation (5).

The signal beam power calculating unit 31-3 adds, in order, changes in the optical power within respective minute ranges calculated by the signal power change calculating unit 31-2 to a power value of the input signal beam retained in the input signal beam information retaining unit 22, from the input end of the signal beam as the starting point and to the output end of the signal beam as the terminating point in the EDFA, thereby calculating a signal beam power according to a position with the coordinate z in the longitudinal direction of the signal beam propagating in the EDFA, which involves a fluctuation in the ion population at the metastable energy level in the EDFA due to input of the input signal beam.

The uncorrected population inversion rate calculating unit 31-4 calculates, as an uncorrected population inversion rate, a population inversion rate n (z) not added thereto a fluctuation in the ion population at the metastable energy level in the EDFA to be used when a change in the optical power is calculated. In concrete, the uncorrected population inversion rate calculating unit 31-4 calculates a population inversion rate n(z) by using an equation of n(z) retained in the basic data retaining unit 21, on the basis of a signal beam power according to a position with a coordinate in the longitudinal direction of the signal beam propagating in the EDFA calculated by the above signal beam power calculating unit 31-3.

The signal beam power change calculating unit 31-2 calculates a minute change dP(z)/dz of the optical power in each minute unit of the length with respect to the longitudinal direction of the EDFA by using the above equation (2), on the basis of a population inversion rate n(z) calculated by the uncorrected inversion rate calculating unit 31-4, a quantity of a change $\Delta n_{SHB}(\lambda,z)$ in the population inversion rate calculated by the population inversion rate change quantity calculating unit 31-1 and the above basic data retained in the basic data retaining unit 21.

The outputting process unit 31-5 outputs a result of calculation of the signal beam power outputted from the signal beam output end in the EDFA calculated by the signal beam power calculating unit 31-3 as a result of simulation of the performance of the EDFA.

Figure 4:
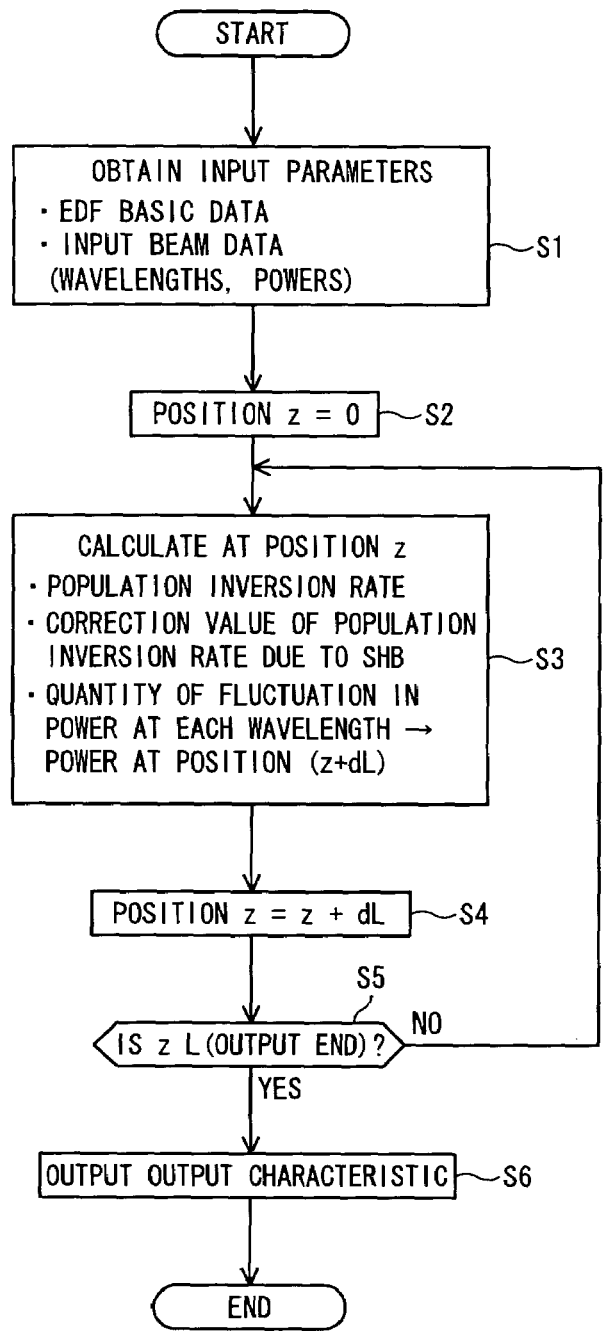
FIG. 4 is a flowchart for illustrating an operation of the amplification medium performance simulation apparatus according to the first embodiment of this invention.

Next, description will be made of an operation of the amplification medium performance simulation apparatus 1 with the above structure according to the first embodiment of this invention with reference to a flowchart shown in FIG. 4.

First, the above basic data of the EDFA and data (wavelength data and an input signal beam powers) relating to the input signal beam are obtained as input parameters through the input interface 10 (step S1). The basic data of the EDFA is retained in the basic data retaining unit 21, whereas the input signal beam data is retained in the input signal beam information retaining unit 22.

Next, at a population inversion rate change quantity calculating step, a quantity of a change $\Delta n_{SHB}(\lambda,z)$ in the population inversion rate caused by a fluctuation in the ion population at the metastable energy level of the EDFA due to input of the signal beam is calculated.

The uncorrected population inversion rate calculating unit 31-4 calculates n(z=0) as the uncorrected population inversion rate at the signal beam input end in the EDF 50 on the basis of the input signal beam information retained in the input signal beam information retaining unit 22.

The population inversion rate change quantity calculating unit 31-1 calculates a value of $\Delta n_{SHB}(\lambda, 0)$ by using the above equation (3) on the basis of the data together with the above n(n=0) retained in the basic data retaining unit 21 and the input signal beam information retaining unit 22.

At an optical power change calculating step, a change in optical power of the signal beam propagating in the amplification medium from the signal beam input end of the EDFA in each minute propagation range is calculated, from the signal beam input end as the starting point to the signal beam output end as the terminating point, by using a propagation equation of the EDFA on the basis of the corrected population inversion rate corrected with a change quantity of the population inversion rate calculated at the population inversion rate quantity calculating step.

In concrete, at an optical power change calculating step, the signal beam power change calculating unit 31-2 calculates a minute change in the optical power at the time that the signal beam propagates through a position of a minute portion $\Delta z$ at the signal beam input end of the EDF 50 by using the equation (2) on the basis of $\Delta n_{SHB}(\lambda, 0)$ calculated by the population inversion rate change quantity calculating unit 31-1 along with a value of n(z=0) calculated by the uncorrected population inversion rate calculating unit 31-4 (steps S2 and S3).

At an output signal beam power calculating step, changes in the optical power within respective minute propagation ranges calculated at the optical power change calculating step are added to the power value of the input signal beam in order from the signal beam input end as the starting point to the signal beam output end as the terminating point, whereby an output signal beam power outputted from the EDFA which involves a fluctuation in the ion population at the metastable energy level in the amplification medium due to input of the input signal beam is calculated.

Namely, the signal optical power calculating unit 31-3 adds a minute change in the optical power calculated as above to the input signal optical power $P_i(0)$ to obtain a signal beam power $P_i(\Delta z)$ propagating at a position of the position $\Delta z$ (step S4).

A change in the optical power in the case where the signal beam further propagates from a position with the coordinate z=$\Delta z$ in the longitudinal direction of the EDF 50 by a minute portion $\Delta z$ can be calculated after A $n_{SHB}(\lambda, \Delta z)$ is calculated in a similar manner to the above. By repeating the above calculation, it is possible to calculate a change in the optical power in each minute propagation range $\Delta z$ from the signal beam input end (z=0) to the output end (z=L) of the EDF 50 (from NO route at step S5 to step S3).

At an outputting process step, a result of calculation calculated at the output signal beam power calculating step is outputted as a result of simulation of the performance of the EDFA. Namely, when the signal beam power calculating unit 31-3 obtains an optical power at the time that the signal beam is outputted from the output end position of the EDF 50, the output processing unit 31-5 outputs the optical power at the time that the signal beam is outputted from the output end as a result of simulation of the output characteristic of the EDFA (step S6).

The simulation executing unit 31 can output a result of the simulation as dependency of the gain deviation on a wavelength spectrum according to the input signal beam power from a relationship between a signal beam power at the time that the signal beam is inputted to the EDFA and a signal beam power at the time that the signal beam is outputted from the EDFA at each optical wavelength, or output it as dependency of the gain deviation on a wavelength spectrum according to a saturation signal wavelength, or output it as dependency of the gain deviation on a wavelength spectrum according to a gain value which is a target (target value) of the automatic gain control.

Figure 5:
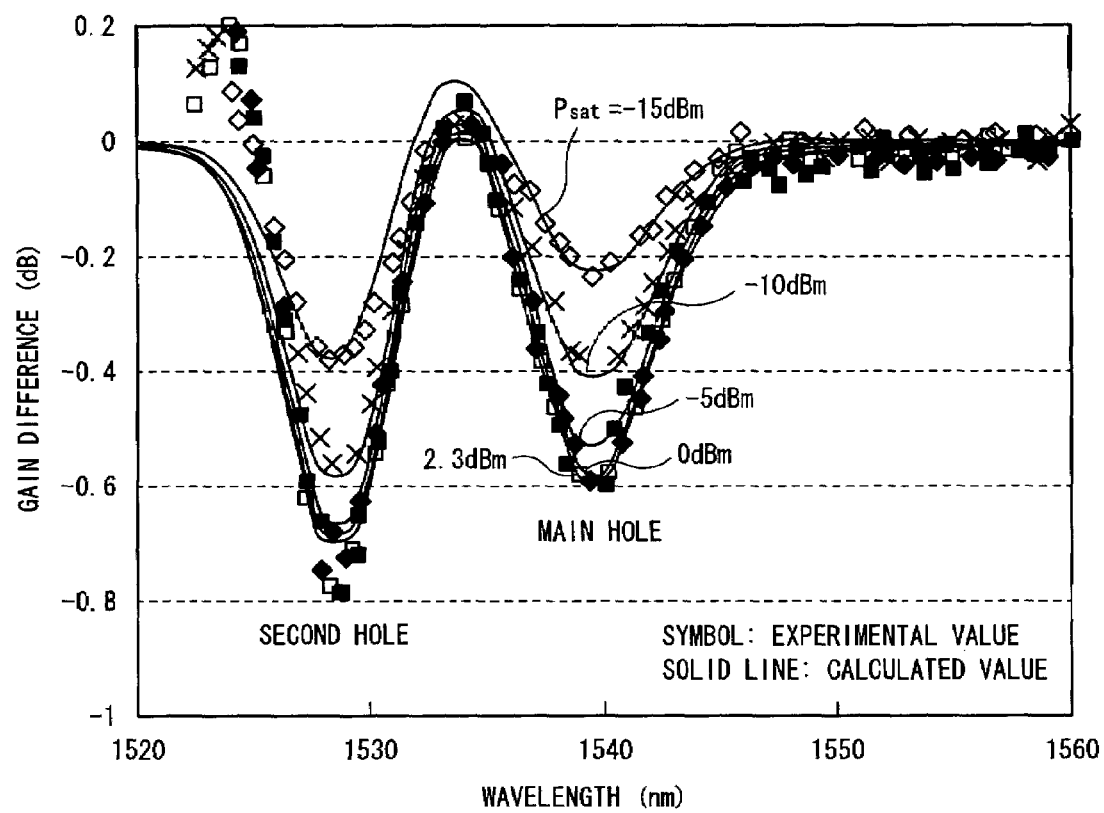
FIGS. 5 through 7 are diagrams in each of which a results of simulation by the amplification medium performance simulation apparatus according to the first embodiment is compared with measured values obtained by experiment.
Figure 6:
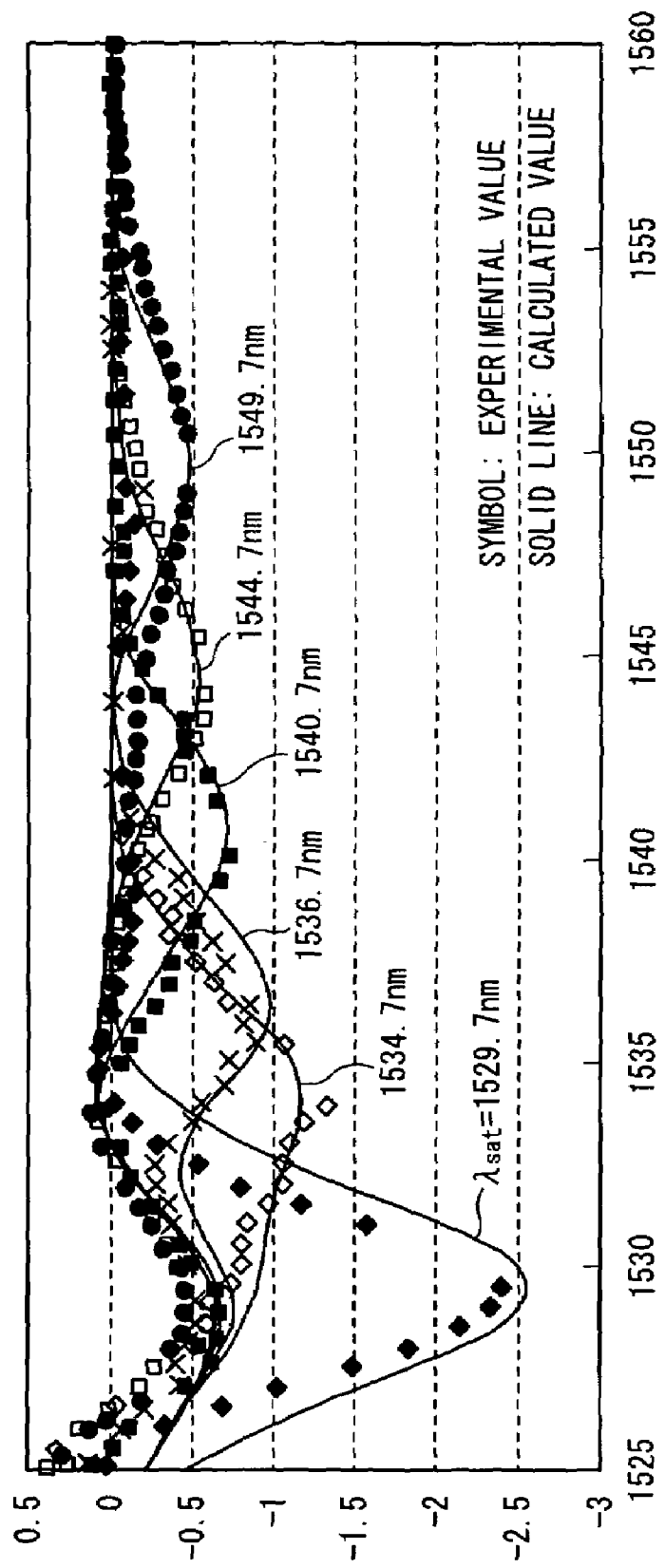
Figure 7:
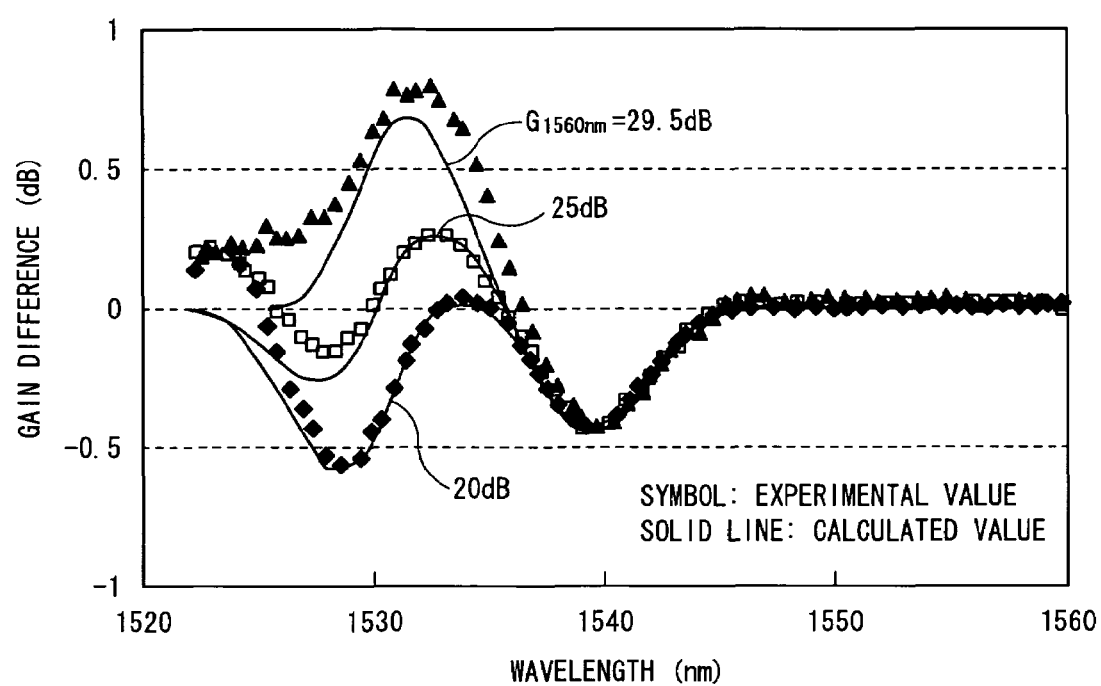

FIGS. 5 through 7 are diagrams in which results (calculated values) of simulation obtained by carrying out simulation by the simulation executing unit 31 is compared with measured values (experimental values) obtained in experiments.

FIG. 5 shows dependency of gain deviation on a wavelength spectrum according to an input signal beam power. In FIG. 5, "♦" represents experimental values obtained when the input signal beam power is 2.3 dBm, "□" represents experimental values obtained when the input signal beam power is 0 dBm, "■" represents experimental values obtained when the input signal beam power is −5 dBm, "X" represents experimental values obtained when the input signal beam power is −10 dBm, and "◇" represents experimental values obtained when the input signal beam power is −15 dBm. Solid lines represent results of simulation with input signal beam powers corresponding to the respective experimental values.

FIG. 6 shows dependency of gain deviation on a wavelength spectrum according to a saturation signal wavelength. In FIG. 6, "♦" represents experimental values obtained when the saturation signal wavelength is 1529.7 nm, "◇" represents experimental values obtained when the saturation signal wavelength is 1534.7 nm, "X" represents experimental values obtained when the saturation signal wavelength is 1536.7 nm, "■" represents experimental values obtained when the saturation signal wavelength is 1540.7 nm, "□" represents experimental values obtained when the saturation signal wavelength is 1544.7 nm, and "●" represents experimental values obtained when the saturation signal wavelength is 1549.7 nm. Solid lines show results of simulation with input signal optical powers corresponding to the respective experimental values.

FIG. 7 shows dependency of gain deviation on a wavelength spectrum according to a gain value to be targeted in the automatic gain control. In FIG. 7, "♦" represents experimental values obtained when the target in the automatic gain control is 20 dB, "□" represents experimental values obtained when the target in the automatic gain control is 25 dB, and "▼" represents experimental values obtained when the target in the automatic gain control is 29.5 dB. Solid lines show results of simulation with input signal beam powers corresponding to the respective experimental values.

From the results of simulation shown in FIGS. 5 through 7, it can be confirmed that the amplification medium performance simulation apparatus 1 according to this embodiment can accurately calculate a gain fluctuation due to SHB. Accordingly, it becomes possible to largely improve the accuracy of gain flatness of an optical repeater by designing the input/output power of the EDFA or the gain equalization characteristic of the gain equalizer on the basis of the results of simulation.

In the amplification medium simulation apparatus according to the first embodiment of this invention, the simulation executing unit 31 can output gain deviation occurring due to a fluctuation in ion population at the metastable energy level in each minute unit of the length in the longitudinal direction of the amplification medium, which involves gain deviation in an area other than the vicinity of the signal wave, in a process within a short period of time by introducing a simple approximation equation.

(b) Description of Second Embodiment

Figure 8:
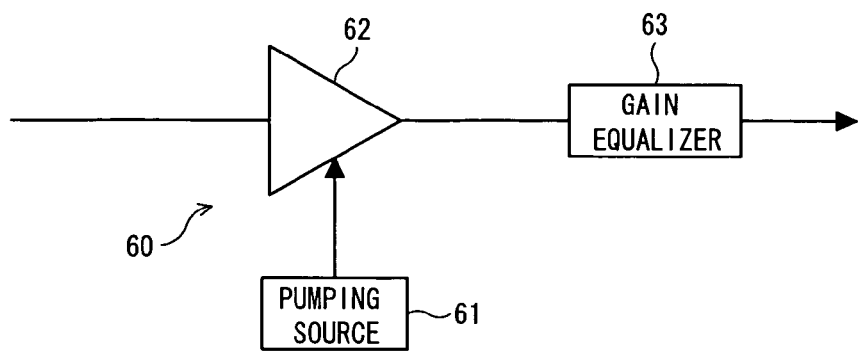
FIG. 8 is a block diagram showing an optical amplifier according to a second embodiment of this invention.

FIG. 8 is a block diagram showing an optical amplifier 60 according to a second embodiment of this invention. In FIG. 8, reference numeral 61 denotes a pumping source outputting a pumping beam, 62 denotes an EDFA as being a signal beam amplification medium excited by a pump beam from the pumping source 61 to amplify an input signal beam, and 63 denotes a gain equalizer equalizing the gain of an output signal beam outputted from the EDFA 62.

The gain equalizer 63 is so designed as to compensate the gain deviation due to a fluctuation in the ion population at the metastable energy level in the EDFA 62 caused by input of the input signal beam, on the basis of a result of simulation fed from the simulation executing unit 31 of an amplification medium performance simulation apparatus 1 similar to that according to the above first embodiment.

Figure 9:
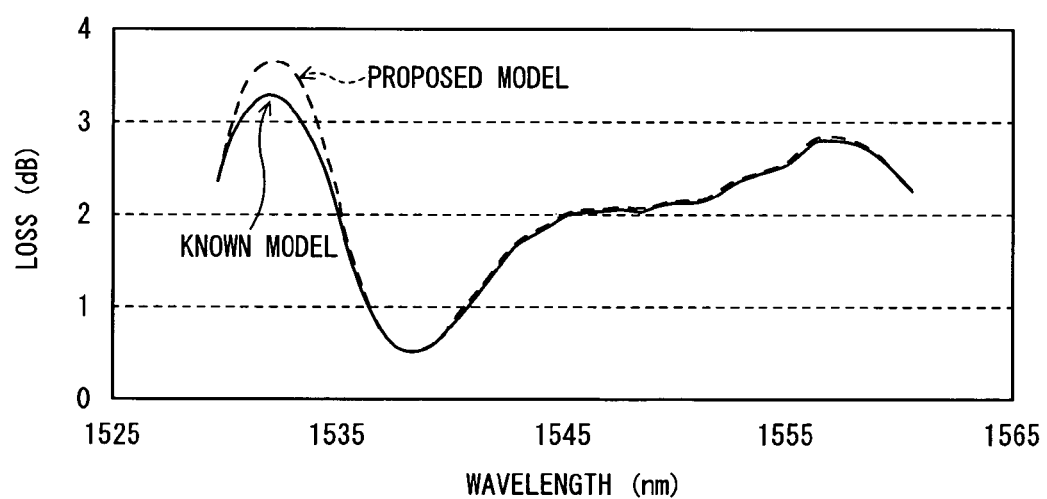
FIG. 9 is a diagram for illustrating a gain equalization characteristic of a gain equalizer disposed in the following stage of an EDFA shown in FIG. 8.

FIG. 9 is a diagram for illustrating the gain equalization characteristic of the gain equalizer 63 disposed in the following stage of the EDFA 62 shown in FIG. 8. In FIG. 9, broken line denotes the gain equalization characteristic of a gain equalizer designed on the basis of the gain deviation characteristic obtained in the amplification medium performance simulation apparatus 1 according to the above first embodiment, solid line denotes the gain equalization characteristic of a gain equalizer when the gain characteristic of the EDFA is approximated to be of a single band.

From FIG. 9, a gain equalizer designed on the basis of the gain deviation characteristic obtained by the amplification medium performance simulation apparatus 1 is expected to be able to compensate gain deviation particularly in the vicinity of 1530 nm.

In the optical amplifier 60 according to the second embodiment of this invention, the gain equalization characteristic of the gain equalizer 63 can be designed on the basis of a result of highly accurate simulation obtained by the simulation executing unit 31 of the amplification medium performance apparatus 1 through a process within a short period of time, whereby a fluctuation in ion population at the metastable energy level in the EDFA 62 due to input of the input signal beam can be compensated.

Particularly, in an optical amplifier which is a constitutional element of a node in a photonic network in which allocation of wavelengths of the signal beam may be dynamically changed, it is possible to stabilize the amplification characteristic, coping with a large change in the wavelength allocation and the number of the wavelengths.

(c) Description of Third Embodiment

Figure 10:
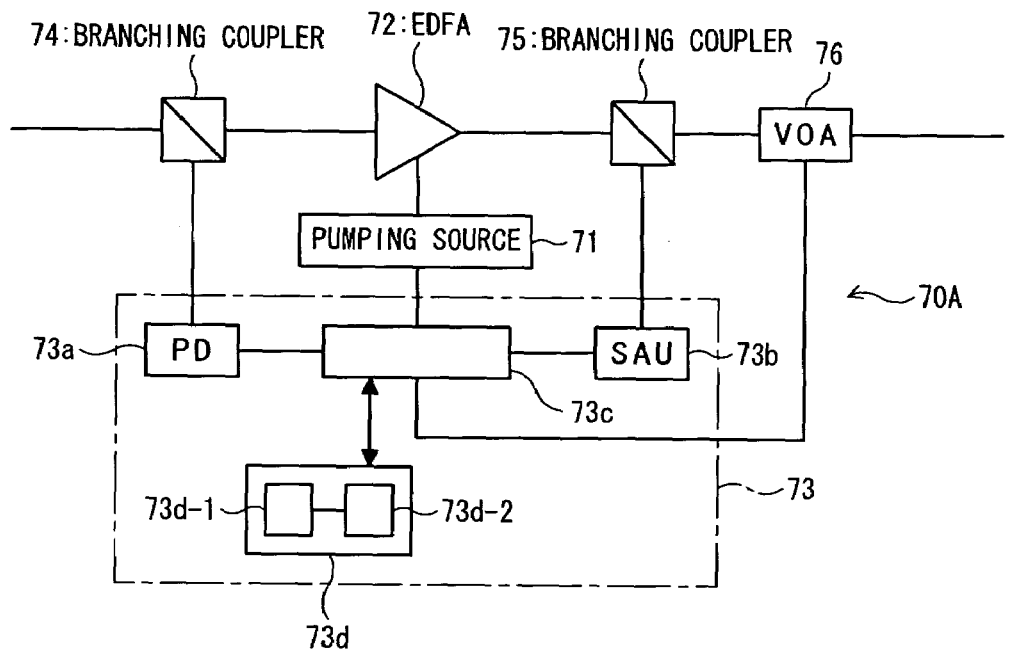
FIG. 10 is a block diagram showing an optical amplifier according to a third embodiment of this invention.

FIG. 10 is a block diagram showing an optical amplifier 70A according to a third embodiment of this invention. In the optical amplifier 70A shown in FIG. 10, reference numeral 71 denotes a pumping source outputting a pump beam, 72 denotes an EDFA as being a signal beam amplification medium excited by a pump beam from the pumping source 71 to amplify the input signal beam, 73 denotes a pumping source controlling unit controlling the pumping source 71, 74 denotes a branching coupler branching a part of the signal beam inputted to the EDFA 72, 75 denotes a branching coupler branching a part of an output signal beam outputted from the EDFA 72, and 76 denotes a variable optical attenuator (VOA) variably attenuating the power of the output signal beam from the branching coupler 75.

The pumping source controlling unit 73 controls the pumping source 71 to compensate the gain deviation due to a fluctuation in ion population at the metastable energy level in the EDFA 72 caused by input of the input signal beam. The pumping source controlling unit 73 comprises a photodiode (PD) 73a, a spectrum analyzer (SAU) 73b, an automatic gain control unit 73c and a correcting unit 73d.

The photodiode 73a monitors the power of a signal beam branched by the branching coupler 74. The spectrum analyzer 73b monitors the power of the output signal beam branched by the branching coupler 75 and information about allocation of the signal wavelengths.

The photodiode 73a and the spectrum analyzer 73b together function as a first power monitor for monitoring the powers of the input signal beam and the output signal beam. The spectrum analyzer 73b also has a function as a wavelength allocation information obtaining unit for obtaining wavelength allocation information on the signal beam propagating in the EDFA 72 as the amplification medium.

The automatic gain control unit 73c outputs a signal for controlling the pumping source 71 on the basis of the powers of the input and output signal beams monitored by the photodiode 73a and the spectrum analyzer 73b as the first power monitoring unit so that the gain is constant.

The correcting unit 73d corrects a control quantity for the pumping source 71 in the automatic gain control unit 73c on the basis of the wavelength allocation information obtained by the spectrum analyzer 73b so that gain deviation in the wavelength band due to spectral hole burning decreases.

For example, the correcting unit 73d has a table 73d-1 for retaining pump beam control information for decreasing the gain deviation obtained on the basis of a result of execution of simulation in the amplification medium performance simulation apparatus 1 according to the above first embodiment, and a retrieving unit 73d-2 for retrieving in the table 73d-1 with the signal beam wavelength allocation information, information on the power ratio (gain) of the input signal beam power to the output signal beam power and the output power as keys, and taking out the pump beam control information for decreasing the gain deviation according to the signal beam wavelength allocation.

Namely, the correcting unit 73d gives the pump beam control information retrieved by the retrieving unit 73d-2 to the automatic gain control unit 73c to correct the control quantity for the pumping source 71 in the automatic gain control unit 73c.

Figure 12:
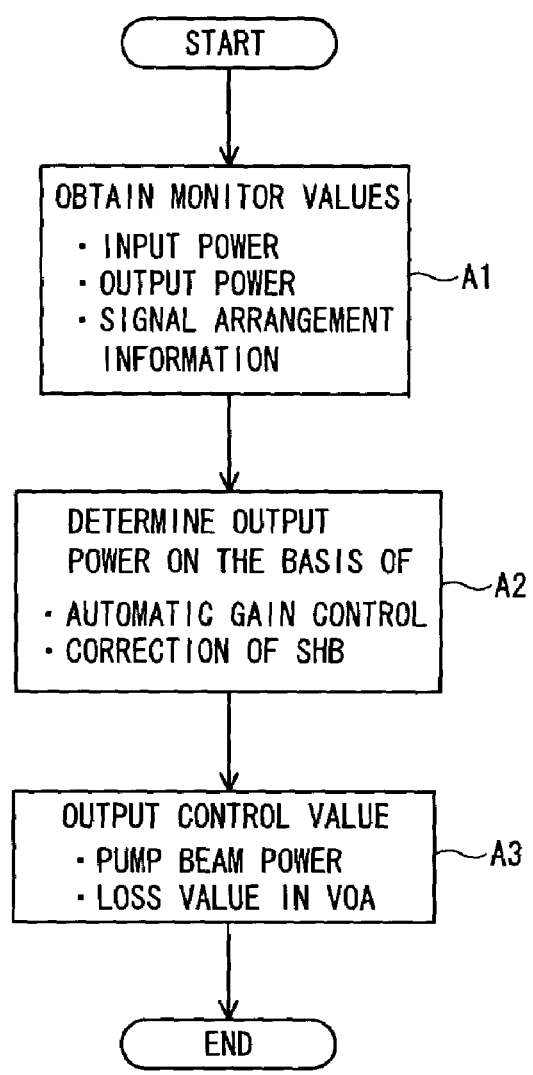
FIG. 12 is a flowchart for illustrating an operation of the optical amplifier according to the third embodiment.

With the above structure, the optical amplifier 70A according to the third embodiment controls the pump beam from the pumping source 71 to compensate the gain deviation due to SHB, as shown in FIG. 12.

The automatic gain control unit 73c in the pumping source controlling unit 73 obtains wavelength allocation information on a signal beam along with an input signal beam power and an output signal beam power from the photodiode 73a and the spectrum analyzer 73b (step A1), calculates the gain state of the EDFA 72 from the obtained data, and determines a target value for the output power so as to obtain a predetermined gain under the automatic gain control.

At this time, the correcting unit 73d receives the signal allocation information, gain information and a monitor value of the output power from the automatic gain control unit 73c, and retrieves in the above table to determine on the basis of these values whether or not it is necessary to correct a fluctuation in gain due to SHB. When correction of SHB is necessary, the correcting unit 73d determines a correction quantity to be added to the target value of the output power on the basis of the signal allocation information, the gain and the output power (step A2).

The automatic gain control unit 73c receives the correction value for the pump beam control determined by the correcting unit 73d to determine an output power to be targeted in the pump beam control. The automatic gain control unit 73c outputs a signal for controlling the intensity or the like of the pump beam supplied from the pumping source 71 so that the output signal beam power monitored by the spectrum analyzer 75 reaches the target value.

Since the output power of the EDFA 72 increases or decreases from an initially desired value when the correcting unit 73d corrects the pump beam control quantity to compensate the fluctuation in gain due to SHB, the VOA 76 controls the loss value so as to obtain the desired output power (step A3).

FIGS. 13 through 18 are diagrams for illustrating a working effect given by superimposing correction of a fluctuation in gain due to SHB on the optical amplifier automatic gain control as above in the optical amplifier 70A according to the third embodiment.

In an optical communication system having such high freedom that the wavelength allocation is dynamically changed, a local fluctuation in gain due to SHB occurs, which leads to an error between the gain wavelength characteristic of the EDFA and the characteristic of the gain equalizer. At this time, when the optical amplifier is operated under the automatic gain control with a pump power $P_{AGC}$, a gain deviation of $\Delta G$ occurs due to SHB. The optical amplifier 70A according to the third embodiment adds a change quantity $\Delta P_{SHB}$ of the pump power corresponding to the correction quantity in the correcting unit 73d to the pump power $P_{AGC}$ to vary the population inversion rate in the optical amplifier 73d, thereby controlling the gain deviation $\Delta G'$ so that $\Delta G > \Delta G'$.

Figure 13:
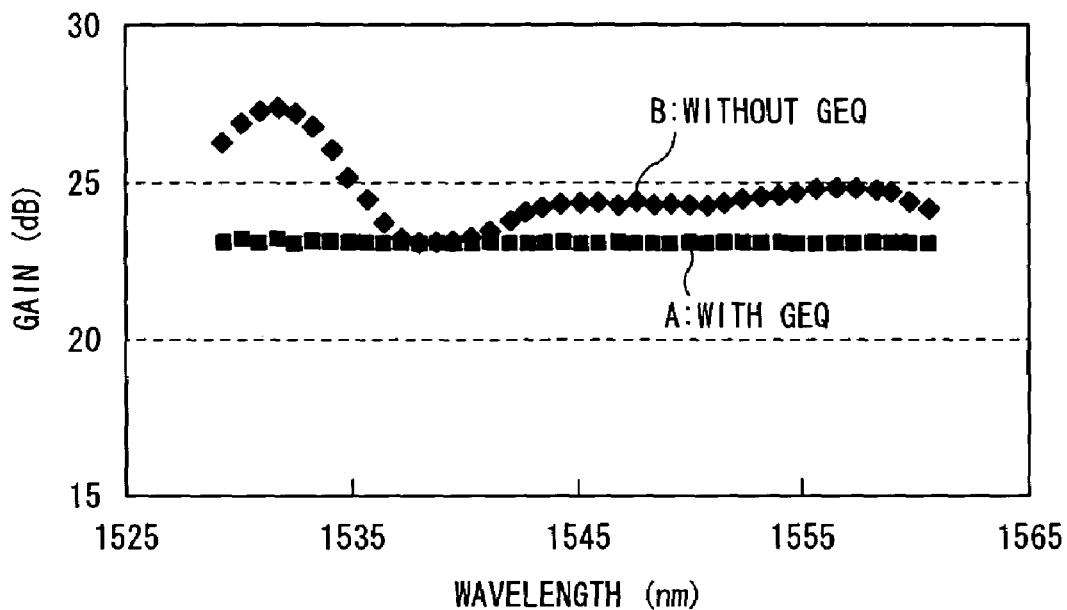
FIGS. 13 through 18 are diagrams for illustrating a working effect given by superimposing correction of a fluctuation in gain due to SHB on an automatic gain control in the optical amplifier according to the third embodiment.
Figure 14:
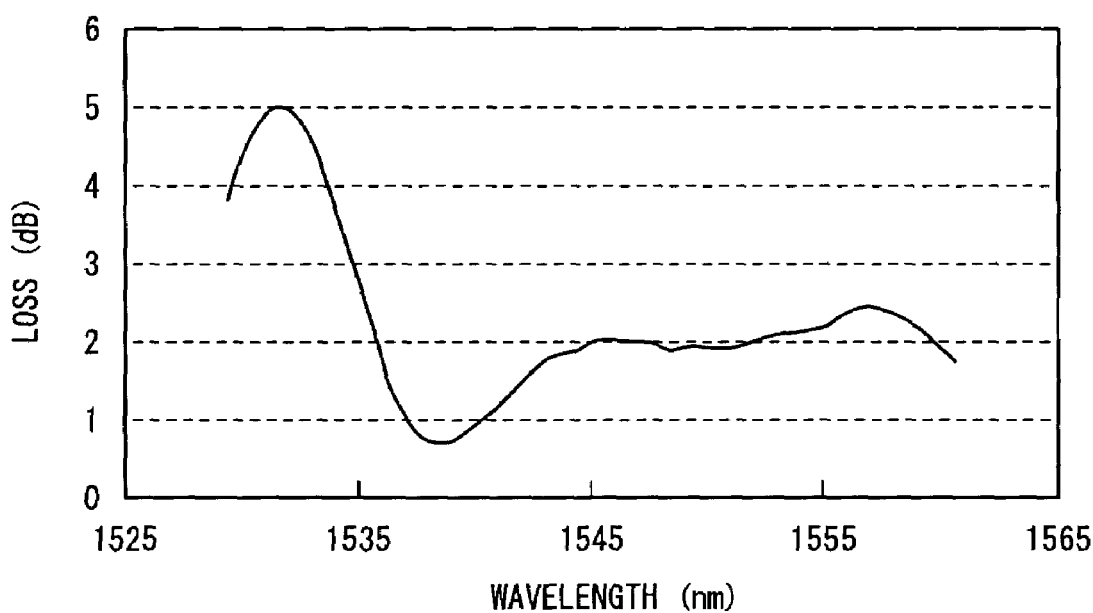

For example, assuming here that a gain equalizer (GEQ) having such a characteristic that the gain wavelength characteristic for a wavelength-multiplexed signal beam of 40 channels becomes flat is inserted into the following stage of the EDFA 72, as shown in FIG. 13. At this time, the gain equalizer has a loss characteristic as shown in FIG. 14. In FIG. 13, the gain characteristic obtained when the gain equalizer is inserted is denoted by A (with GEQ), whereas the gain characteristic obtained when the gain equalizer is not inserted is denoted by B (without GEQ).

As an example where the wavelengths are concentrated in longer wavelengths in the allocation, assuming that a wavelength-multiplexed signal beam having a wavelength allocation in which one channel (wavelength of 1533.5 nm) is arranged at a shorter wavelength and eight channels (1555–1560.6 nm) are arranged at longer wavelengths is inputted to the EDFA 72, and the pump beam is so controlled that the average gain becomes constant under the automatic gain control by the automatic gain control unit 73c.

Figure 15:
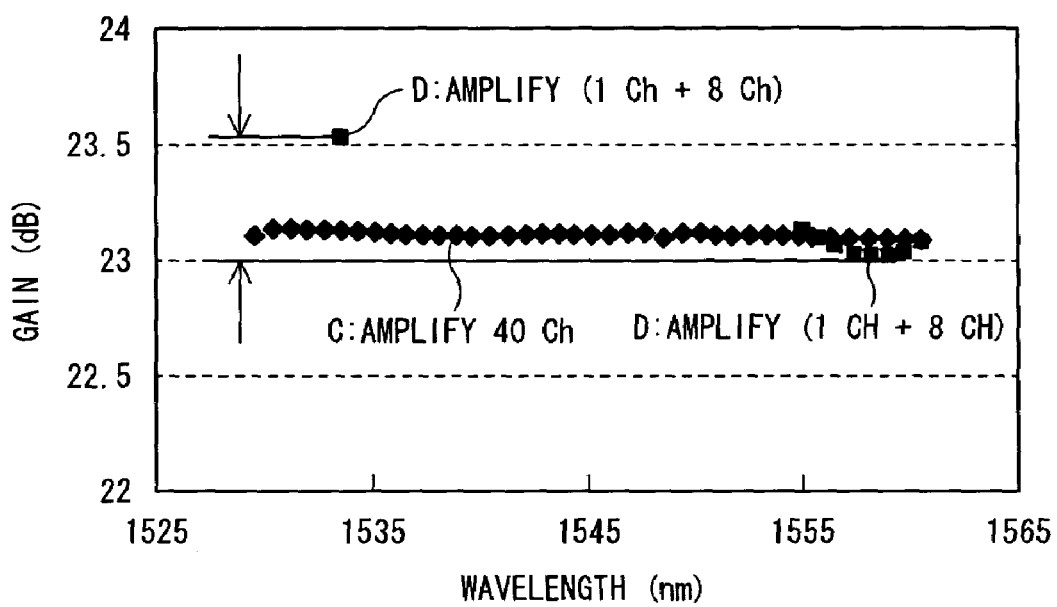
Figure 16:
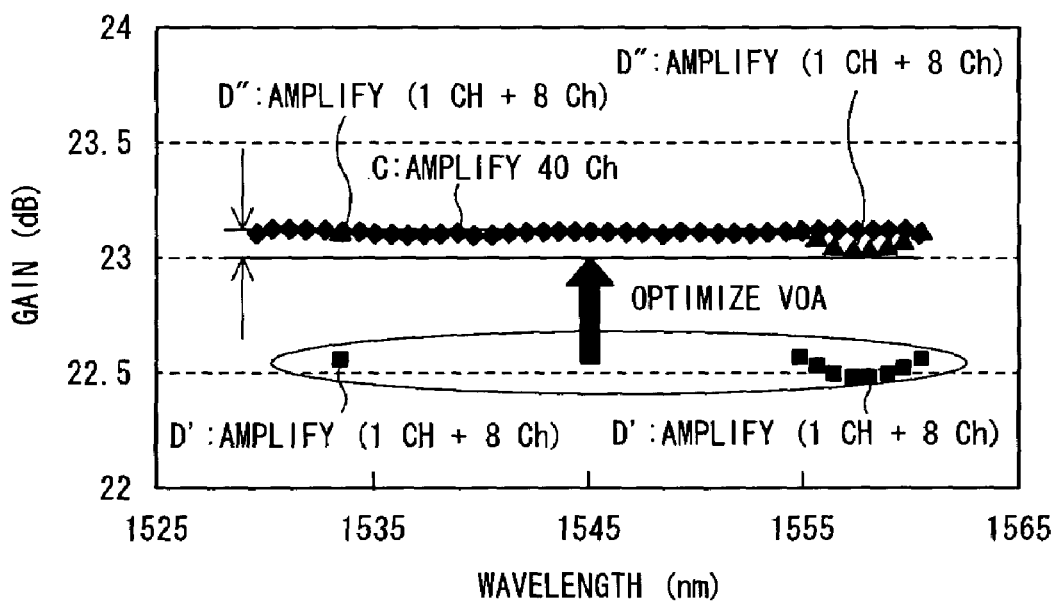

When the automatic gain control unit 73c performs only the automatic gain control, the pumping source 71 supplies a pump beam having, for example, a co-propagating pump beam of 53 mW and a counter-propagating pump beam of 32 mW to the EDFA 72. FIG. 15 is a diagram showing the gain wavelength characteristic of the signal beam in each of the wavelength allocations in the case where the above automatic gain control unit 73c performs only the automatic gain control on the EDFA in which the signal beam having the above wavelength allocation propagates.

As the gain wavelength characteristic (refer to "♦" in FIG. 15) denoted by C in FIG. 15 at the time that 40 channels were amplified, the gain deviation was 0.03 dB between the channels. As the gain wavelength characteristic (refer to "■" in FIG. 15) at the time of amplification denoted by D (one channel at the shorter wavelength and eight channels at the longer wavelengths) in FIG. 15, the gain deviation was 0.51 dB. As this, it is found that it is difficult to sufficiently decrease the gain deviation by the automatic gain control.

For this, the correcting unit 73d controls the pumping source 71 with a control quantity corrected by using a correction quantity according to the wavelength allocation of the signal beam wavelengths and the optical output power, thereby decreasing the counter-propagating pump power from the pumping source 71 from 32 mW to 21 mW. By doing so, it is possible to largely compensate the gain deviation to about 0.09 dB although the average gain of the signal beam decreases, as denoted by D' (refer to "■" in FIG. 16) in FIG. 16, for example. Incidentally, the decreased average gain of the EDFA 72 is interpolated by decreasing the loss quantity in the variable optical attenuator 76 (refer to "▼" of D" in FIG. 16).

Likewise, as an example where the wavelengths are concentrated in shorter wavelengths in the allocation, assuming that a wavelength-multiplexed signal beam having a wavelength allocation in which four channels (1529.6–1531.9 nm) are arranged at shorter wavelengths and one channel (1556.6 nm) is arranged at a longer wavelength is inputted, and the pump beam is so controlled that the average gain is constant under the automatic gain control by the automatic gain control unit 73c.

Figure 17:
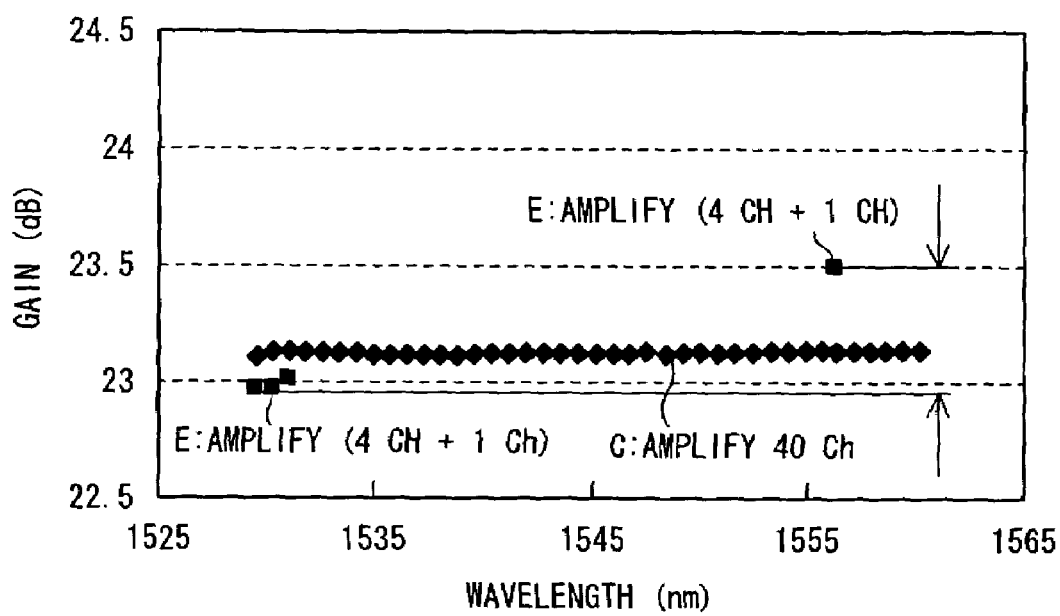
Figure 18:
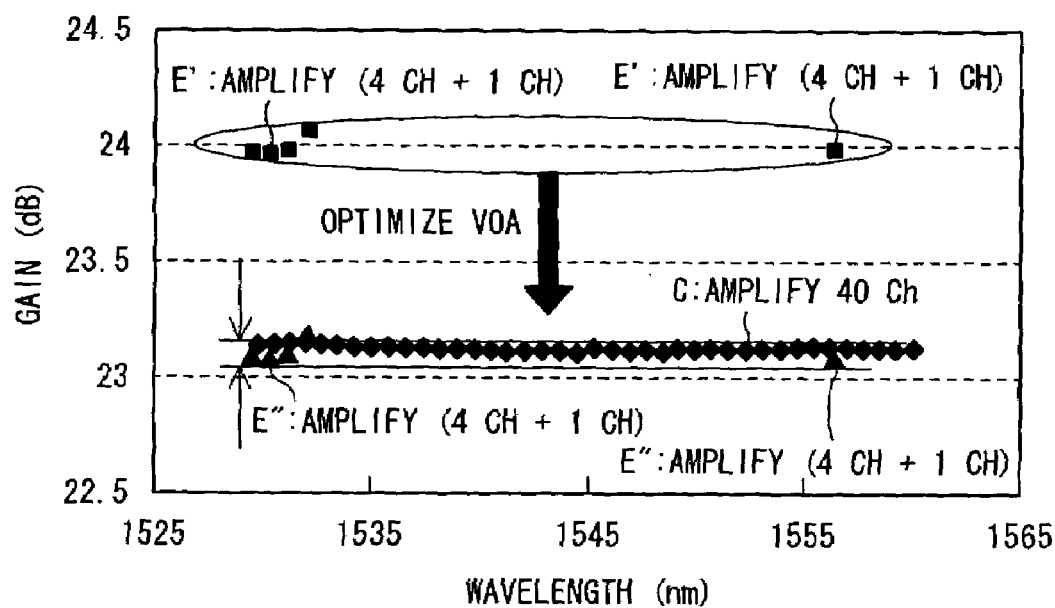

When the automatic gain control unit 73c performs only the automatic gain control, the pumping source 71 supplies a pump beam having a co-propagating pump beam having a pump power of 81.3 mW and a counter-propagating pump beam having a pump power of 0 mW to the EDFA 72, for example. FIG. 17 is a diagram showing the gain wavelength characteristic of the signal beam in the above wavelength allocation in the case where the above automatic gain control unit 73c performs only the automatic gain control on the EDFA 72 in which the signal beam in the above wavelength allocation propagates.

As the gain wavelength characteristic (refer to "♦" in FIG. 17) denoted by C in FIG. 17 obtained when 40 channels were amplified, the gain deviation was 0.03 dB among the channels. As the gain wavelength characteristic (refer to "■" in FIG. 17) at the time of amplification denoted by E (four channels at the shorter wavelengths and one channel at the longer wavelength) in FIG. 17, the gain deviation was 0.5 dB. As this, it is found that it is difficult to sufficiently decrease the gain deviation by the automatic gain control.

For this, the correcting unit 73d controls the pumping source 71 with a control quantity corrected by using a correction quantity according to the wavelength allocation of the signal beam wavelengths and the optical output power, thereby increasing the counter-propagating pump power from the pumping source 71 from 0 mW to 15 mW. By doing so, it is possible to largely compensate the gain deviation to about 0.11 dB although the average gain of the signal beam increases, as denoted by E' (refer to "■" in FIG. 18) in FIG. 18, for example. Incidentally, the increased average gain of the EDFA 72 is interpolated by increasing the loss quantity in the variable optical attenuator 76 (refer to "▼" on E' in FIG. 18).

In the above description, the counter-propagating pump power is corrected to decrease the gain deviation. However, the pump power to be adjusted may be the co-propagating pump power, or both the copropating pump power and the counter-propagating pump power.

As above, in the optical amplifier 70A according to the third embodiment of this invention, the pumping source controlling unit 73 can control the pumping source 71 on the basis of a result of highly accurate simulation obtained by the simulation executing unit 31 in the amplification medium performance simulation apparatus 1 through a process within a short period of time so that the gain deviation due to a fluctuation in ion population at the metastable energy level in the EDFA 72 is compensated. Accordingly it is possible to greatly improve the stability of the automatic gain control.

Particularly, in an optical amplifier which is a constitutional element in a node in a photonic network in which the wavelength allocation of a signal beam are dynamically changed, it is possible to stabilize the amplification characteristic, coping with a large change in the wavelength allocation and the number of wavelengths.

Figure 11:
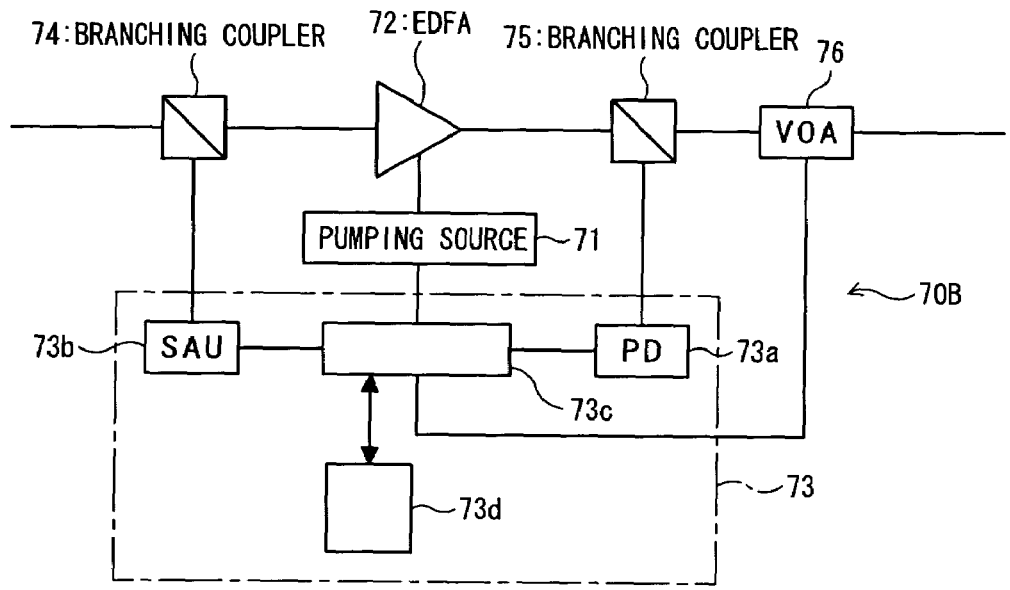
FIG. 11 is a block diagram showing a modification of the third embodiment.

As a modification of the third embodiment, as in the optical amplifier 70B shown in FIG. 11, the SAU 73b may be disposed on the input's side of the EDFA 72 to obtain the signal allocation information, and the photodiode 73a may monitor the power of the output signal beam outputted from the EDFA 72.

(d) Description of Fourth Embodiment

Figure 19:
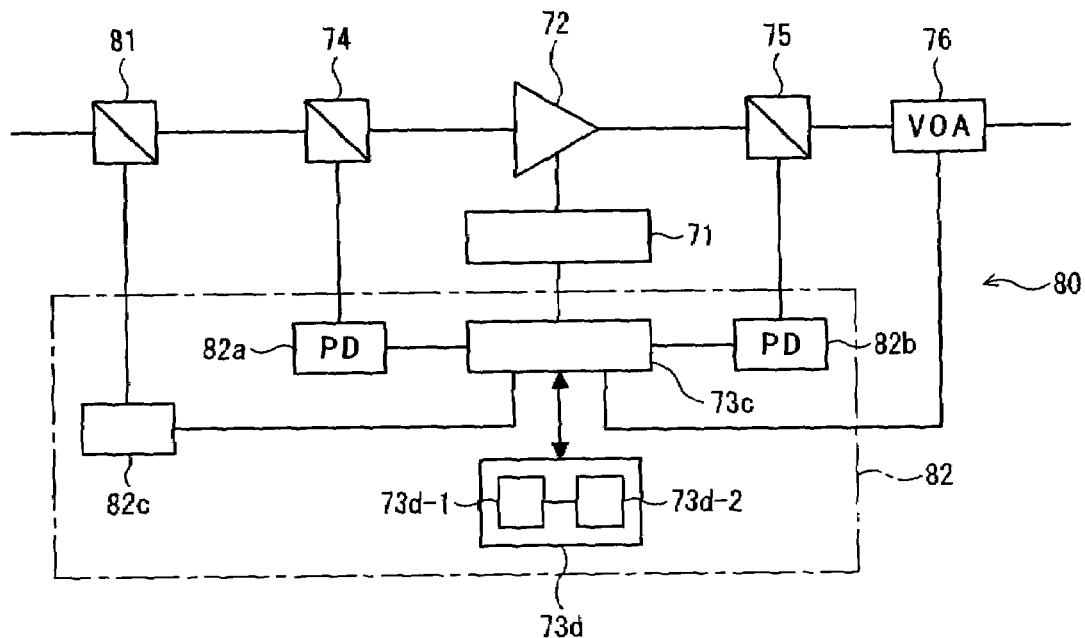
FIG. 19 is a block diagram showing an optical amplifier according to a fourth embodiment of this invention.

FIG. 19 is a block diagram showing an optical amplifier 80 according to a fourth embodiment of this invention. The optical amplifier 80 shown in FIG. 19 comprises a pumping source 71, an EDFA 72, branching couplers 74 and 75, and a VOA 76, like the optical amplifier according to the above third embodiment. Unlike the optical amplifier according to the third embodiment, the optical amplifier 80 further comprises a WDM (Wavelength Division Multiplexing) coupler 81 and a pumping source controlling unit 82.

The WDM coupler 81 separates a control signal beam having the wavelength assigned as a control signal from a signal beam of a wavelength-multiplexed beam inputted to the optical amplifier 80. The control signal is outputted to the pumping source controlling unit 82, whereas the signal beam is outputted to the branching coupler 74.

The pumping source controlling unit 82 controls the pumping source 71. The pumping source controlling unit 82 comprises photodiodes (PDs) 82a and 82b, a control signal analyzing unit 82c, an automatic gain control unit 73c and a correcting unit 73d.

The photodiode 82a monitors the power of the signal beam branched by the branching coupler 74. The photodiode 82b monitors the power of an output signal beam branched by the branching coupler 75. Accordingly, the above photodiodes 82a and 82b together function as a first power monitor for monitoring the powers of the input signal beam and the output signal beam.

The control signal analyzing unit 82c receives a control signal beam transmitted together with the signal beam by means of a photodiode through the WDM coupler 81, and analyzes the received signal to take out wavelength allocation information as control information. The control signal analyzing unit 82c functions as a wavelength allocation information obtaining unit for obtaining the wavelength allocation information on the signal beam propagating in the EDFA 72 which is an amplification medium. Namely, the control signal analyzing unit 82c obtains the wavelength allocation information from the control signal beam transmitted together with the signal beam.

The automatic gain control unit 73c has a similar function as that according to the above third embodiment. The automatic gain control unit 73c outputs a signal for controlling the pumping source 71 on the basis of the powers of the input and output signal beams monitored by the photodiodes 82a and 82b as being the first power monitor so that the gain is constant.

Like the correcting unit 73d according to the third embodiment, the correcting unit 73d corrects the control quantity for the pumping source 71 in the automatic gain control unit 73c on the basis of the wavelength allocation information obtained by the control signal analyzing unit 82c so that the gain deviation in the wavelength band due to spectrum hole burning decreases. The correcting unit 73d comprises a table 73d-1 and a retrieving unit 73d-2.

Next, description will be made of an operation of the optical amplifier 80 according to the fourth embodiment with reference to a flowchart in FIG. 12.

The control signal analyzing unit 82c of the pumping source controlling unit 82 obtains the wavelength allocation information on the signal beam from the control signal beam transmitted together with the signal beam, and monitor information on the input/output beam powers from the photodiodes 82a and 82b (refer to step A1 in FIG. 12).

The automatic gain control unit 73c performs the automatic gain control on the basis of results of input/output beam power monitoring by the photodiodes 82a and 82b (step A2). The correcting unit 73d corrects the control quantity from the automatic gain control unit 73c for the pumping source 71 on the basis of the wavelength allocation information from the control signal analyzing unit 82c and the results of input/output beam power monitoring from the photodiodes 82a and 82b to compensate the gain deviation due to SHB. Incidentally, the increased or decreased average gain of the EDFA 72 is interpolated by adjusting the loss quantity in the variable optical attenuator 76 (step A3).

In the optical amplifier 80 according to the fourth embodiment of this invention, the pumping source controlling unit 82 can control the pumping source 71 on the basis of a result of highly accurate simulation obtained by the simulation executing unit 31 of the amplification medium performance simulation apparatus 1 according to the above first embodiment through a process within a short period of time so that the gain deviation due to a fluctuation in ion population at the metastable energy level in the EDFA 72 is compensated. Thus, it becomes possible to greatly improve the stability of the automatic gain control.

Particularly, in an optical amplifier which is a constitutional element in a node in a photonic network in which the wavelength allocation of the signal beam may be dynamically changed, it is possible to stabilize the amplification characteristic, coping with a large change in the wavelength allocation and the number of the wavelength.

Further, since the wavelength allocation information obtaining unit can be configured without a spectrum analyzer, it is possible to reduce the apparatus fabrication cost as compared with the optical amplifier 80 according to the third embodiment.

(e) Description of Fifth Embodiment

Figure 20:
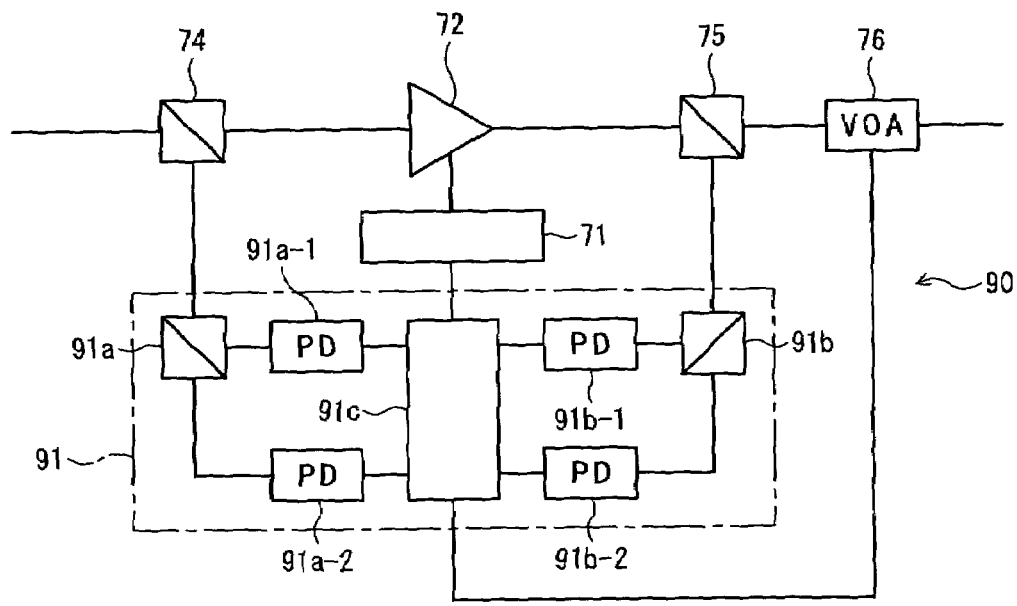
FIG. 20 is a block diagram showing an optical amplifier according to a fifth embodiment of this invention.

FIG. 20 is a block diagram showing an optical amplifier 90 according to a fifth embodiment of this invention. Like the optical amplifier according to the third embodiment, the optical amplifier 90 shown in FIG. 20 comprises a pumping source 71, an EDFA 72, branching couplers 74 and 75, and a VOA 76. However, the optical amplifier 90 further comprises a pumping source controlling unit 91 which differs from that according to the third embodiment.

The pumping source controlling unit 91 is designed on the basis of a result of simulation obtained by the amplification medium performance simulation apparatus 1 according to the first embodiment to control the EDFA so that the gain deviation due to a fluctuation in ion population at the metastable energy level in the EDFA 72 caused by input of an input signal beam is compensated. Unlike the optical amplifier according to the third and fourth embodiments, the optical amplifier 90 does not have a function as the wavelength allocation information obtaining unit.

Namely, the pumping source controlling unit 91 comprises band dividing filters 91a and 91b, photodiodes 91a-1, 92a-2, 91b-1 and 91b-2 and an automatic average gain control unit 91c.

Each of the band dividing filers 91a and 91b divides a power-branched beam of the signal beam on the input side of the EDFA 72 from the branching coupler 74 or on the output's side of the EDFA 75 into a plurality (two in the fifth embodiment) of signal beams, whereby the band of the power-branched beam is divided.

On the basis of assumption that the gain deviation occurs due to SHB, each of the band dividing filers 91a and 91b divides the signal beam according to a result of simulation by the amplification medium performance simulation apparatus 1 according to the above first embodiment so that the average gains of the bands are almost equivalent and stable.

Figure 22:
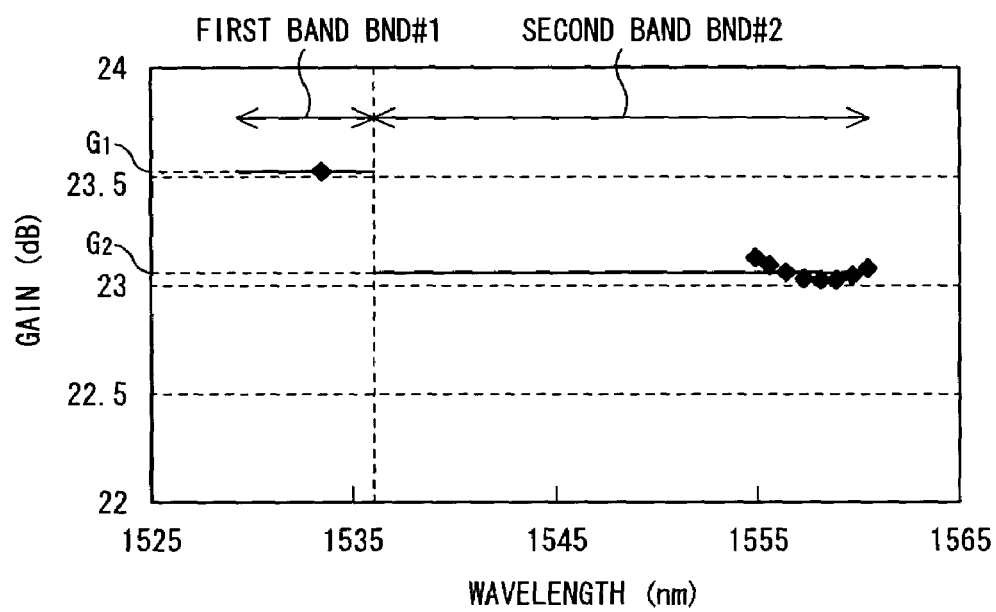
FIGS. 22 and 23 are diagrams for illustrating a working effect given by the optical amplifier according to the fifth embodiment of this invention.
Figure 23:
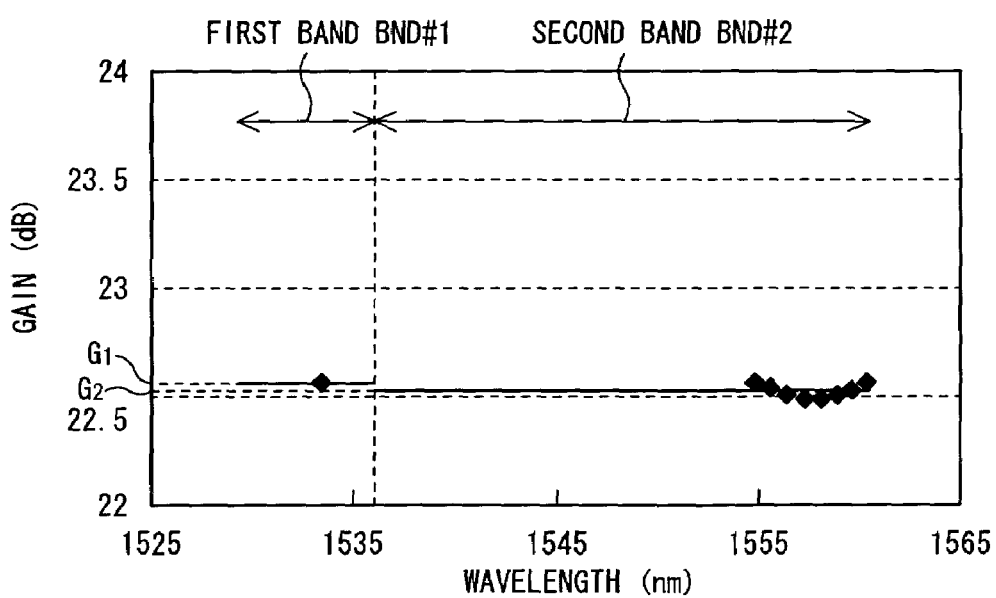
Figure 24:
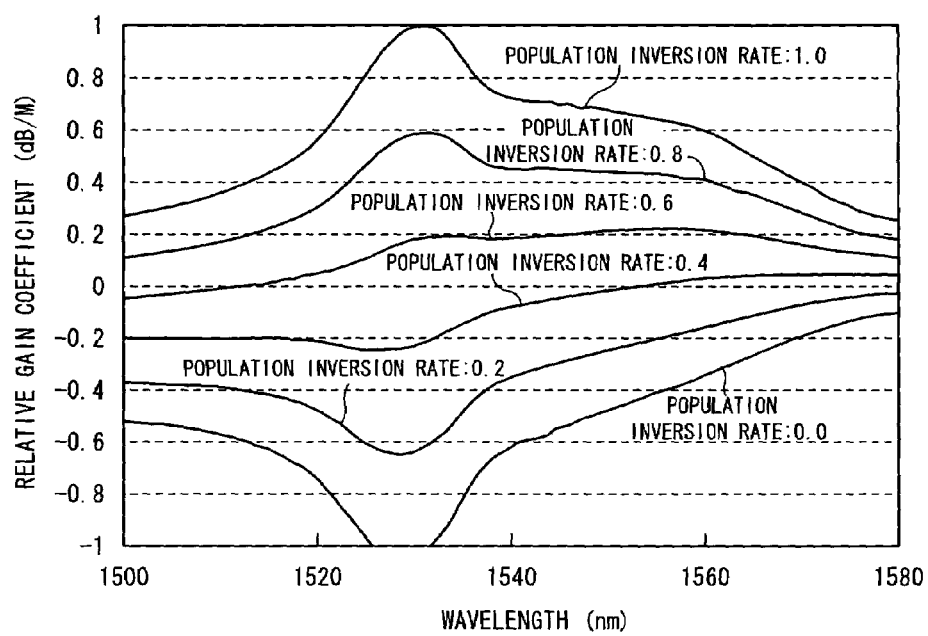
FIG. 24 is a diagram for illustrating an example where a wavelength characteristic (gain spectrum) is approximated and grasped according to a value of a population inversion rate with the whole amplification band of an EDFA being one unit.
Figure 25:
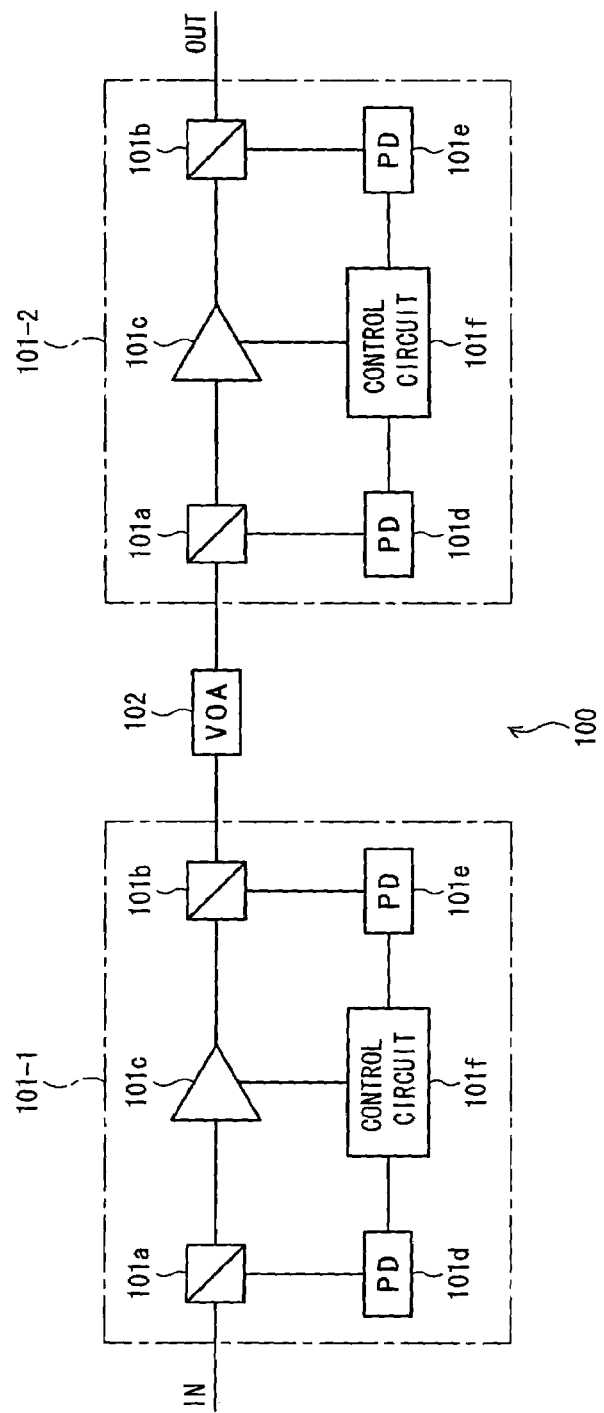
FIG. 25 is a block diagram showing an example of the structure of an optical repeater used in a known optical network system in which wavelength allocation and the number of wavelengths are assumed not to be largely changed.
Figure 26:
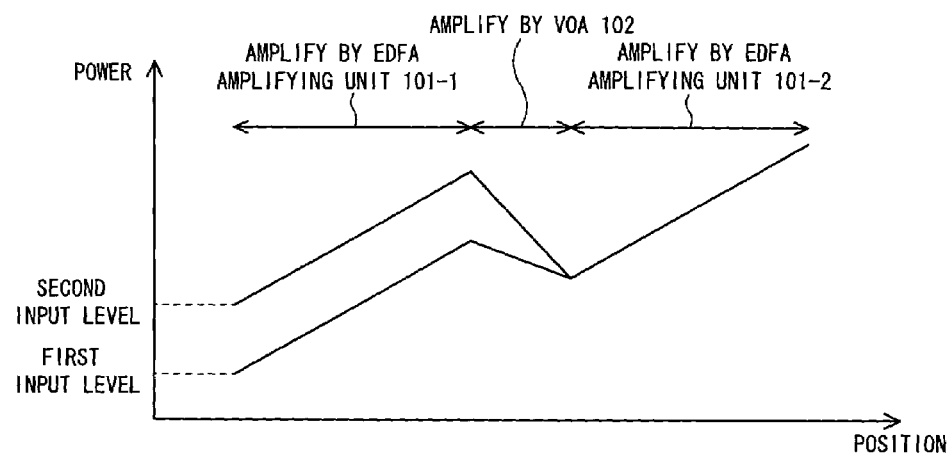
FIG. 26 is a diagram for illustrating an example where the output power of the optical repeater is made constant by adjusting a loss quantity in a variable optical attenuator shown in FIG. 25.

For example, each of the wavelength dividing filers 91a and 91b can divide the wavelength band into two as shown in FIGS. 22 and 23 to be described later. With respect to the gain fluctuation characteristic due to SHB of the EDFA 72 used as the amplification medium, results of simulation of it were obtained by the amplification medium simulation apparatus 1 as shown in above FIGS. 5 through 7. From these simulation results, it is found that the effect of SHB on the EDFA 72 is particularly large in the vicinity of 1530 nm.

The EDFA 72 is divided into two bands, which are a first band at shorter wavelengths (about 1529–1536 nm) and a second band at longer wavelengths (about 1536–1561 nm), according to the strength of SHB.

The photodiodes 91a-1 and 91a-2 monitor the signal beam powers of the signal beams in two bands divided by the band dividing filter 91a. Similarly, the photodiodes 91b-1 and 91b-2 monitor the signal beam powers of the signal beams in two bands divided by the band dividing filter 91b.

For example, the photodiodes 91a-1 and 91b-1 receive divided signal beams in the above first band, whereas the photodiodes 91a-2 and 91b-2 receive divided signal beams in the above second band.

The above band dividing filters 91a and 91b, and the photodiodes 91a-1, 91a-2, 91b-1 and 91b-2 function together as a second power monitor for obtaining powers of the input signal beam and the output signal beam in the plural bands divided on the basis of a result of simulation obtained by the amplification medium performance simulation apparatus 1.

The automatic average gain control unit 91c outputs a signal for controlling the pumping source 71 on the basis of the powers of the input signal beam and the output signal beam in the bands obtained by the photodiodes 91a-1, 91a-2, 91b-1 and 91b-2 so that the average gains in the bands are equivalent.

Since the magnitude of a fluctuation in gain caused by SHB differs according to the wavelength in the amplification band, the gain deviation occurs. Accordingly, each of the wavelength dividing filters 91a and 91b beforehand divides the amplification band of the EDFA 72 into a plurality of bands, and the automatic average gain control unit 91c adjusts the pump power so that the average gains of the bands become equal, thereby keeping the flatness of the gain.

Figure 21:
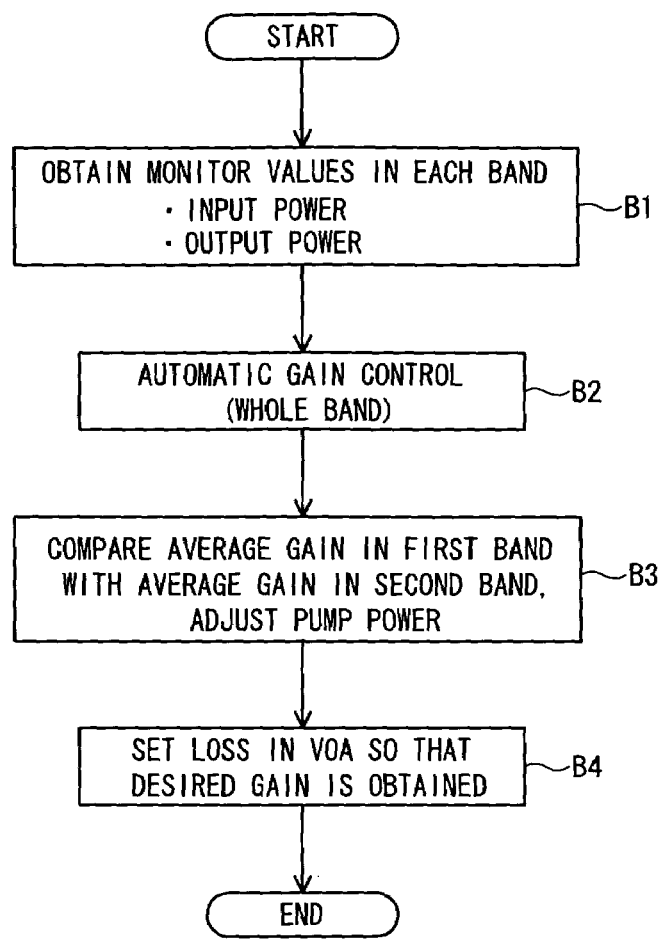
FIG. 21 is a flowchart for illustrating an operation of the optical amplifier according to the fifth embodiment of this invention.

Next, description will be made of an operation of the optical amplifier 90 according to the fifth embodiment of this invention with reference to a flowchart in FIG. 21.

The signal beam inputted to the EDFA 72 is branched by the branching coupler 74, divided into the first band and the second band by the band dividing filter 91a, and received by the photodiodes 91a-1 and the 91a-2. Similarly, the output signal beam outputted from the EDFA 72 is branched by the branching coupler 75, divided into the first band and the second band by the band dividing filter 91b, and received by the photodiodes 91b-1 and 91b-2.

When the automatic average gain controlling unit 91c receives signals according to input signal beam powers from the photodiodes 91a-1 and 91a-2, and signals according to output signal beam powers from the photodiodes 91b-1 and 91b-2 (step B1), the automatic average gain control unit 91c performs the known automatic gain control on the whole band (step B2).

Namely, the automatic average gain control unit 91c outputs a control signal for controlling the pumping source 71 on the basis of the input/output signal beams in the first band from the photodiodes 91a-1 and 91b-1 and the input/output signal beams in the second band from the photodiodes 91a-2 and 91b-2 so that the gain of the whole band, which is addition of the first band and the second band, is constant.

After that, the automatic average gain control unit 91c calculates an average gain of each of the first band and the second band divided. When a gain deviation occurs due to the effect of SHB, deviation occurs between the average gains in the first band and the second band. Since the bands are divided according to the strength of SHB, each of the gain deviation in the first band and the gain deviation in the second band is smaller than a calculated gain deviation between the average gains in the divided bands.

Thus, the automatic average gain calculating unit 91c compares a calculated average gain $G_1$ in the first band with a calculated average gain $G_2$ in the second band, and outputs a control signal for increasing or decreasing the pump power in the pumping source 71 according to a result of the comparison.

Namely, when the average gain $G_1$ in the first band is larger than the average gain $G_2$ in the second band ($G_1 > G_2$), the automatic average gain control unit 91c decreases the pump power so that the population inversion rate is small. When $G_1$ is smaller than $G_2$ ($G_1 < G_2$), the automatic average gain control unit 91c outputs a control signal for increasing the pump power to the pumping source 71 so that the population inversion rate is large (step B3).

Accordingly, the population inversion rate becomes smaller or larger under the control for increasing/decreasing the pump beam power from the pumping source 71, whereby the average gains $G_1$ and $G_2$ can be approximately uniform. Incidentally, a fluctuation in gain of the output signal beam due to the pump beam power increasing/decreasing control is compensated by varying the loss quantity in the VOA 76 (step B4).

FIGS. 22 and 23 show an example where the gain deviation due to SHB is compensated by controlling the pumping source 71 by the automatic average gain controlling unit 91c in the optical amplifier 90 according to the fifth embodiment of this invention.

FIG. 22 shows average gains in the both bands calculated by the automatic average gain control unit 91c when gain deviation due to SHB occurs because a signal having one channel in the first band BND#1 at the shorter wavelength and eight channels in the second band BND#2 at the longer wavelengths is inputted. As shown in FIG. 22, the average gain $G_1$ in the first band BND#1 is 23.5 dB, the average gain $G_2$ in the second band BND#2 is 23 dB, thus a gain deviation of 0.5 dB between the bands generates.

Since the average gain in the first band BND#1 is larger than the average gain in the second band BND#2 ($G_1 > G_2$), the automatic average gain control unit 91c controls the co-propagating pump beam or the counter-propagating pump beam or the both to decrease the same. Whereby, the average gains in both the first band BND#1 and the second band BND#2 are almost equivalent as shown in FIG. 23, thus the gain deviation due to SHB is corrected.

Since the gain obtained after the SHB is corrected is smaller than the desired gain in this case, the loss quantity in the VOA 76 is decreased to compensate the decreased gain.

Like the above third and fourth embodiments, in the optical amplifier 90 according to the fifth embodiment, the pumping source controlling unit 91 can control the pumping source 71 on the basis of a result of highly accurate simulation obtained by the simulation executing unit 31 in the amplification medium performance simulation apparatus 1 according to the above first embodiment through a process within a short period of time so that the gain deviation due to a fluctuation in ion population at the metastable energy level in the EDFA 72 is compensated. Accordingly, it is possible to greatly improve the stability of the automatic gain control.

Particularly, in an optical amplifier which is a constitutional element of a node in a photonic network in which wavelength allocation of the signal beam may be largely changed, it is possible to stabilize the amplification characteristic, coping with a large change in the wavelength allocation and the number of wavelengths.

Unlike the above fourth embodiment, even in a system in which the control signal does not contain the signal allocation information, it is possible to correct the gain deviation due to SHB without an analyzer while decreasing the apparatus fabrication cost.

(f) Others

Note that the present invention is not limited to the above examples, but may be modified in various ways without departing from the scope of the invention.

For example, the amplification medium performance simulation apparatus 1 according to the first embodiment adopts a Gaussian function as shown in the equation (3) in order to calculate the quantity of a change in the population inversion rate due to SHB in the EDFA. However, this invention is not limited to this example. For example, it is alternatively possible to adopt a function having a mountain-like shape having a center wavelength and a width such as a Lorentzian function, Voigt function or the like to form the first function and the second function.

In concrete, the Gaussian function [refer to the equation (6)] forming the first function or the Gaussian function [refer to the equation (7)] forming the second function in the equation (3) can be appropriately replaced by a Lorentzian function shown in equation (8) or a Voigt function shown in equation (9).

$$f(\lambda) = \exp\left(-\ln(2)\frac{(\lambda - \lambda_i)^2}{(BW_i/2)^2}\right) \tag{6}$$

$$f(\lambda) = \exp\left(-\ln(2)\left(\frac{(\lambda - \lambda_j)^2}{(BW_j/2)^2}\right)\right) \tag{7}$$

$$f(\lambda) = \frac{1}{\pi}\frac{BW}{(\lambda - \lambda_0)^2 + BW_0^2} \tag{8}$$

$$f(\lambda) = \frac{1}{BW_g}\sqrt{\frac{\ln(2)}{\pi}} K(x, y) \tag{9}$$

where $$K(x, y) \equiv \frac{y}{\pi}\int_{-\infty}^{\infty}\frac{e^{-t^2}}{y^2 + (x-t)^2} dt$$

$$y \equiv \frac{BW_l}{BW_g}\sqrt{\ln(2)}$$

$$x \equiv \frac{\lambda - \lambda_0}{BW_g}\sqrt{\ln(2)}$$

and $BW_g$ is the full width half minimum of the Gaussian function, $BW_l$ is the full width half minimum of the Lorentzian function and $\lambda_0$ is the center wavelength.

In the above embodiments, the gain deviation characteristic of the EDFA is simulated. However, this invention is not limited to this example. The gain deviation due to SHB of an amplification medium other than EDFA may be simulated by executing an operation using at least one or more functions (for example, Gaussian functions) by the simulation executing unit 31 in accordance with the embodiments.

Persons skilled in the art can manufacture the invention so long as the embodiments of the present invention are disclosed.

INDUSTRIAL APPLICABILITY

As described above, the amplification medium performance simulation apparatus according to this invention is useful when the performance of an amplification medium applied when a photonic network is configured, and is particularly suited to perform simulation of the gain deviation characteristic due to SHB of EDFA.

The invention claimed is:

1. An amplification medium performance simulation apparatus for simulating performance of an amplification medium excited by a pump light from a pumping source to amplify a signal light comprising:
    a basic data retaining unit for retaining basic data of said amplification medium;
    an input signal light information retaining unit for retaining a total power and a power at each wavelength of an input signal light as information on the input signal light to be inputted to an amplification medium to be simulated; and
    a simulation executing unit for reckoning a fluctuation in ion population at metastable energy levels corresponding to said input signal wavelength and a wavelength which is specific to said amplification medium, in said amplification medium caused by input of said input signal light, and approximating and calculating an output signal light power at each signal light wavelength outputted from said amplification medium on a basis of a result of the reckoning, by using contents retained in said basic data retaining unit and said input signal light information retaining unit, and outputting a result of the calculation as a result of simulation of the performance of said amplification medium.

2. The amplification medium performance simulation apparatus according to claim 1, wherein said simulation executing unit comprises:
    a population inversion rate calculating unit for calculating a population inversion rate on the basis of a signal light power according to a position with a coordinate in the longitudinal direction of said amplification medium;
    a population inversion rate change quantity calculating unit for calculating a quantity of a change in population inversion rate which may occur due to a fluctuation in ion population at the metastable energy level of said amplification medium caused by input of said input signal light, as a function of a wavelength of the input signal light and a position in the longitudinal direction of said amplification medium, by using the population inversion rate calculated by said population inversion rate calculating unit and contents retained in said basic data retaining unit and said input signal light information retaining unit;
    a signal light power change calculating unit for performing calculation of a change in optical power of the signal light propagating through said amplification medium from a signal light input end in said amplification medium in each of minute propagation ranges started from the signal light input end and terminated at a signal light output end, by using a differential equation defined by the quantity of a change in population inversion rate calculated by said population inversion rate change quantity calculating unit and the contents retained in said basic data retaining unit and said input signal light information retaining unit;
    a signal light power calculating unit for adding, in order, changes in optical power in the minute propagation ranges from a change in optical power in the minute range at the signal input end as a starting point to a change in optical power in the minute range at the signal light output end as a terminating point calculated by said signal light power change calculating unit to the power value of the input signal light retained in said input signal light information retaining unit between the signal light input end and the signal light output end, to calculate a signal light power according to a position with a coordinate in the longitudinal direction of the signal light propagating in said amplification medium including the fluctuation in ion population at the metastable energy level in said amplification medium caused by input of said input signal light; and
    an outputting process unit for outputting a result of calculation of the power of the signal light outputted from the signal light output end calculated by said signal light power calculating unit as a result of simulation of the performance of said amplification medium.

3. The amplification medium performance simulation apparatus according to claim 2, wherein said population inversion rate change quantity calculating unit uses at least one or more Gaussian functions as functions for calculating the quantity of a change in the population inversion rate.

4. The amplification medium performance simulation apparatus according to claim 2, wherein said population inversion rate change quantity calculating unit for calculating a quantity of a change in the population inversion rate comprises:
    a first function operating unit for operating a first function having a first wavelength band in a gain saturation state as a center;
    a second function operating unit for operating a second function comprised of a function having a second wavelength band characteristic of said amplification medium as a center; and
    an adding unit for adding results of the operations from said first function operating unit and said second function operating unit.

5. The amplification medium performance simulation apparatus according to claim 4, wherein said first function operated by said first function operating unit is composed of a total of Gaussian functions given according to respective wavelengths of the input signal light, and said second function operated by said second function operating unit is composed of a total of a plurality of Gaussian functions.

6. The amplification medium performance simulation apparatus according to claim 5, wherein the Gaussian function given according to each wavelength of the input signal light in the first function is determined as a value expressed in terms of a center wavelength which is a wavelength of the input signal light and a full width half maximum according to said amplification medium, each of the Gaussian functions in the second function is determined as a value expressed in terms of a center wavelength which is in a second wavelength band characteristic of said amplification medium and a full width half maximum according to said amplification medium, and the full width half maximum of each of the Gaussian functions in the first function and the second function is retained in said basic data retaining unit.

7. The amplification medium performance simulation apparatus according to claim 5, wherein a depth of each of the Gaussian functions in the first function or the second function is defined by a depth function which increases as a total power of the input signal light increases, and saturates above a predetermined value.

8. The amplification medium performance simulation apparatus according to claim 7, wherein
the depth function of each Gaussian function given according to each wavelength of the input signal light in the first function is defined by a function having a wavelength $\lambda_i$ of the input signal light, an optical power $P_i(z)$ at a position with a coordinate z in the longitudinal direction of said amplification medium at the wavelength $\lambda_i$ of the input signal light and a total power $P_{total}(z)$ of the input signal light at a position with a coordinate z in the longitudinal direction of said amplification medium as variables;
the depth function of each Gaussian function in the second function is defined by a function having a wavelength $\lambda_i$ in the second wavelength band, a total power $P_{total}(z)$ of the input signal light at a position with the coordinate z in the longitudinal direction of said amplification medium and a population inversion rate $n(z)$ of said amplification medium as variables; and
coefficients defining the depth functions of the Gaussian functions in the first function and the second function are retained in said basic data retaining unit.

9. The amplification medium performance simulation apparatus according to claims 2, wherein
the basic data retaining unit retains, as the basic data of said amplification medium, at least an overall length of said amplification medium, a gain coefficient $g(\lambda)$, an absorption coefficient $a(\lambda)$ and a loss $l(\lambda)$ expressed as functional equations with respect to each input signal light wavelength, and a population inversion rate $n(z)$ not added thereto the fluctuation in ion population at the metastable energy level in said amplification medium;
said signal light power change calculating unit calculates the population inversion rate $n(z)$ from a signal light power according to a position with a coordinate in the longitudinal direction of the signal light propagating in said amplification medium calculated by said signal light power calculating unit, and calculates a minute change in optical power of the signal light propagating at a position with the coordinate z in the longitudinal direction of said amplification medium, by using a change in optical power in each minute unit of the length in the longitudinal direction of said amplification medium $$dP(z)/dz=\{(g(\lambda)+\alpha(\lambda))(n(z)\Delta n_{SHB}(\lambda,z))-(\alpha(\lambda)+1(\lambda))\}\cdot P(z)$$

using the population inversion rate $n(z)$, the change quantity $\Delta n_{SHB}(\lambda,Z)$ of the population inversion rate calculated by said population inversion rate change quantity calculating unit and the basic data retained in said basic data retaining unit.

10. The amplification medium performance simulation apparatus according to claims 1, wherein said simulation executing unit approximates and calculates gain deviation among signal light wavelengths caused by spectral hole burning.

11. An optical amplifier comprising:
a pumping source for outputting a pump light;
a signal light amplification medium excited by the pump light from said pumping source to amplify an input signal light; and a gain equalizer for equalizing a gain of an output signal light outputted from said signal light amplification medium; wherein
said gain equalizer has a gain equalization characteristic so that it compensates gain deviation due to a fluctuation in ion population at a metastable energy level in said amplification medium caused by input of the input signal light, on the basis of a result of simulation outputted from an amplification medium performance simulation apparatus for simulating the performance of said amplification medium excited by the pump light from said pumping source to amplify the signal light, said amplification medium performance simulation apparatus comprising:
a basic data retaining unit for retaining basic data of said amplification medium;
an input signal light information retaining unit for retaining a total power and a power at each wavelength of the input signal light as information on the input signal light to be inputted to said amplification medium to be simulated; and
a simulation executing unit for reckoning a fluctuation in ion population at a metastable energy levels corresponding to said input signal wavelength and a wavelength which is specific to said amplification medium, in said amplification medium caused by input of the input signal light, and approximating and calculating an output signal light power at each signal light wavelength outputted from said amplification medium on a basis of a result of the reckoning, by using contents retained in said basic data retaining unit and said input signal light information retaining unit, and outputting a result of calculation as a result of simulation of the performance of said amplification medium.

12. An optical amplifier comprising:
a pumping source for outputting a pump light;
a signal light amplification medium excited by the pump light from said pumping source to amplify an input signal light; and
a pumping source controlling unit for controlling said pumping source;
said pumping source controlling unit controlling said pumping source so that it compensates gain deviation due to a fluctuation in ion population at a metastable energy level in said amplification medium caused by input of the input signal light, on the basis of a result of simulation outputted from an amplification medium performance simulation apparatus for simulating the performance of said amplification medium excited by the pump light from said pumping source to amplify the signal light, said amplification medium performance simulation apparatus comprising:
a basic data retaining unit for retaining basic data of said amplification medium;
an input signal light information retaining unit for retaining a total power and a power at each wavelength of the input signal light as information on the input signal light to be inputted to said amplification medium to be simulated; and
a simulation executing unit for reckoning a fluctuation in ion population at a metastable energy levels corresponding to said input signal wavelength and a wavelength which is specific to said amplification medium, in said amplification medium caused by input of the input signal light, and approximating and calculating an output signal light power at each signal light wavelength outputted from said amplification medium on the basis of a result of the reckoning, by using contents retained in said basic data retaining unit and said input signal light information retaining unit, and outputting a result of calculation as a result of simulation of the performance of said amplification medium.

13. The optical amplifier according to claim 12, wherein said pumping source controlling unit comprises:
   a first power monitor for monitoring powers of the input signal light and the output signal light;
   a wavelength allocation information obtaining unit for obtaining wavelength allocation information on a signal light propagating in said amplification medium;
   an automatic gain control unit for outputting a signal for controlling said pumping source obtained on the basis of the powers of the input signal light and the output signal light monitored by said first power monitor so that a gain of said optical signal amplification medium is constant; and
   a correcting unit for correcting a control quantity for said pumping source in said automatic gain control unit on the basis of the wavelength allocation information obtained by said wavelength allocation information obtaining unit so that gain deviation in a wavelength band due to spectral hole burning decreases.

14. The optical amplifier according to claim 13, wherein said wavelength allocation information obtaining unit is comprised of a spectrum analyzer monitoring wavelength allocation of a signal light inputted to or outputted from said amplification medium.

15. The optical amplifier according to claim 13, wherein said wavelength allocation information obtaining unit obtains the wavelength allocation information from a control signal light transmitted together with the signal light.

16. The optical amplifier according to claim 12, said pumping source controlling unit comprises:
   a second power monitor for obtaining powers of the input signal light and the output signal light in each of a plurality of bands divided on the basis of a result of the simulation obtained by said amplification medium performance simulation apparatus; and
   an automatic average gain control unit for outputting a signal for controlling said pumping source on the basis of the powers of the input signal light and the output signal light in each of the bands obtained by said second power monitor so that average gains in said bands are equalized.

17. The optical amplifier according to claim 12, wherein said simulation executing unit comprises:
   a population inversion rate calculating unit for calculating a population inversion rate on the basis of a signal light power according to a position with a coordinate in the longitudinal direction of said amplification medium;
   a population inversion rate change quantity calculating unit for calculating a quantity of a change in population inversion rate which may occur due to a fluctuation in ion population at the metastable energy level of said amplification medium caused by input of said input signal light, as a function of a wavelength of the input signal light and a position in the longitudinal direction of said amplification medium, by using the population inversion rate calculated by said population inversion rate calculating unit and contents retained in said basic data retaining unit and said input signal light information retaining unit;
   a signal light power change calculating unit for performing calculation of a change in optical power of the signal light propagating through said amplification medium from a signal light input end in said amplification medium in each of minute propagation ranges started from the signal light input end and terminated at a signal light output end, by using a differential equation defined by the quantity of a change in population inversion rate calculated by said population inversion rate change quantity calculating unit and the contents retained in said basic data retaining unit and said input signal light information retaining unit;
   a signal light power calculating unit for adding, in order, changes in optical power in the minute propagation ranges from a change in optical power in the minute range at the signal input end as a starting point to a change in optical power in the minute range at the signal light output end as a terminating point calculated by said signal light power change calculating unit to the power value of the input signal light retained in said input signal light information retaining unit between the signal light input end and the signal light output end, to calculate a signal light power according to a position with a coordinate in the longitudinal direction of the signal light propagating in said amplification medium including the fluctuation in ion population at the metastable energy level in said amplification medium caused by input of said input signal light; and
   an outputting process unit for outputting a result of calculation of the power of the signal light outputted from the signal light output end calculated by said signal light power calculating unit as a result of simulation of the performance of said amplification medium.

18. The optical amplifier according to claim 12, wherein said population inversion rate change quantity calculating unit uses at least one or more Gaussian functions as functions for calculating the quantity of a change in the population inversion rate.

19. The optical amplifier according to claim 17, wherein said population inversion rate change quantity calculating unit for calculating a quantity of a change in the population inversion rate comprises:
   a first function operating unit for operating a first function having a first wavelength band in a gain saturation state as a center;
   a second function operating unit for operating a second function comprised of a function having a second wavelength band characteristic of said amplification medium as a center; and
   an adding unit for adding results of the operations from said first function operating unit and said second function operating unit.

20. The optical amplifier according to claim 19, wherein said first function operated by said first function operating unit is composed of a total of Gaussian functions given according to respective wavelengths of the input signal light, and said second function operated by said second function operating unit is composed of a total of a plurality of Gaussian functions.

21. The optical amplifier according to claim 20, wherein the Gaussian function given according to each wavelength of the input signal light in the first function is determined as a value expressed in terms of a center wavelength which is a wavelength of the input signal light and a full width half maximum according to said amplification medium, each of the Gaussian functions in the second function is determined as a value expressed in terms of a center wavelength which is in a second wavelength band characteristic of said amplification medium and a full width half maximum according to said amplification medium, and the full width half maximum of each of the Gaussian functions in the first function and the second function is retained in said basic data retaining unit.

22. The optical amplifier according to claim 20, wherein a depth of each of the Gaussian functions in the first function or the second function is defined by a depth function which increases as a total power of the input signal light increases, and saturates above a predetermined value.

23. The optical amplifier according to claim 22, wherein the depth function of each Gaussian function given according to each wavelength of the input signal light in the first function is defined by a function having a wavelength $\lambda_i$ of the input signal light, an optical power $P_i(z)$ at a position with a coordinate z in the longitudinal direction of said amplification medium at the wavelength $\lambda_i$ of the input signal light and a total power $P_{total}(z)$ of the input signal light at a position with a coordinate z in the longitudinal direction of said amplification medium as variables;

the depth function of each Gaussian function in the second function is defined by a function having a wavelength $\lambda_i$ in the second wavelength band, a total power $P_{total}(z)$ of the input signal light at a position with the coordinate z in the longitudinal direction of said amplification medium and a population inversion rate n(z) of said amplification medium as variables; and coefficients defining the depth functions of the Gaussian functions in the first function and the second function are retained in said basic data retaining unit.

24. The optical amplifier according to claims 17, wherein the basic data retaining unit retains, as the basic data of said amplification medium, at least an overall length of said amplification medium, a gain coefficient $g(\lambda)$, an absorption coefficient $\alpha(\lambda)$ and a loss $l(\lambda)$ expressed as functional equations with respect to each input signal light wavelength, and a population inversion rate n(z) not added thereto the fluctuation in ion population at the metastable energy level in said amplification medium;

said signal light power change calculating unit calculates the population inversion rate n(z) from a signal light power according to a position with a coordinate in the longitudinal direction of the signal light propagating in said amplification medium calculated by said signal light power calculating unit, and calculates a minute change in optical power of the signal light propagating at a position with the coordinate z in the longitudinal direction of said amplification medium, by using a change in optical power in each minute unit of the length in the longitudinal direction of said amplification medium $dP(z)/dz=\{(g(\lambda)+\alpha(\lambda))(n(z)+\Delta n_{SHB}(\lambda,z))-(\alpha(\lambda)+l(\lambda))\} \cdot P(z)$ using the population inversion rate n(z), the change quantity $\Delta n_{SHB}(\lambda,z)$ of the population inversion rate calculated by said population inversion rate change quantity calculating unit and the basic data retained in said basic data retaining unit.

25. The optical amplifier according to claims 12, wherein said simulation executing unit approximates and calculates gain deviation among signal light wavelengths caused by spectral hole burning.

* * * * *

UNITED STATES PATENT AND TRADEMARK OFFICE
CERTIFICATE OF CORRECTION

PATENT NO.        : 7,212,335 B2
APPLICATION NO.   : 11/187938
DATED             : December 26, 2006
INVENTOR(S)       : Masato Nishihara et al.

It is certified that error appears in the above-identified patent and that said Letters Patent is hereby corrected as shown below:

Col. 29, line 32, delete "a($\lambda$)" and insert -- $\alpha(\lambda)$ --, therefor.

Column 29, lines 50-51, delete "$dP(z)/dz=\{(g(\lambda)+\alpha(\lambda))(n(z)\Delta n_{SHB}(\lambda,z))-(\alpha(\lambda)+1(\lambda))\}\cdot P(z)$" and insert -- $dP(z)/dz=\{(g(\lambda)+\alpha(\lambda))(n(z)+\Delta n_{SHB}(\lambda,z))-(\alpha(\lambda)+1(\lambda))\}\cdot P(z)$ --, therefor.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,212,335 B2 | Page 1 of 1 |
| APPLICATION NO. | : 11/187938 | |
| DATED | : May 1, 2007 | |
| INVENTOR(S) | : Masato Nishihara et al. | |

It is certified that error appears in the above-identified patent and that said Letters Patent is hereby corrected as shown below:

Col. 29, line 32, delete "a($\lambda$)" and insert -- $\alpha(\lambda)$ --, therefor.

Column 29, lines 50-51, delete "$dP(z)/dz=\{(g(\lambda)+\alpha(\lambda))(n(z)\Delta n_{SHB}(\lambda,z))-(\alpha(\lambda)+1(\lambda))\}\bullet P(z)$" and insert -- $dP(z)/dz=\{(g(\lambda)+\alpha(\lambda))(n(z)+\Delta n_{SHB}(\lambda,z))-(\alpha(\lambda)+1(\lambda))\}\bullet P(z)$ --, therefor.

This certificate supersedes Certificate of Correction issued August 28, 2007.

Signed and Sealed this

Twenty-fifth Day of September, 2007

JON W. DUDAS
*Director of the United States Patent and Trademark Office*